US012701019B2

(12) United States Patent
Fujimoto et al.

(10) Patent No.: US 12,701,019 B2
(45) Date of Patent: Aug. 4, 2026

(54) CONTROL METHOD, NON-TRANSITORY COMPUTER-READABLE RECORDING MEDIUM STORING CONTROL PROGRAM, AND INFORMATION PROCESSING DEVICE

(71) Applicant: FUJITSU LIMITED, Kawasaki (JP)

(72) Inventors: Shingo Fujimoto, Yokohama (JP); Ken Kamakura, Machida (JP)

(73) Assignee: Fujitsu Limited, Kawasaki (JP)

( * ) Notice: Subject to any disclaimer, the term of this patent is extended or adjusted under 35 U.S.C. 154(b) by 275 days.

(21) Appl. No.: 18/471,120

(22) Filed: Sep. 20, 2023

(65) Prior Publication Data

US 2024/0015038 A1     Jan. 11, 2024

Related U.S. Application Data

(63) Continuation of application No. PCT/JP2021/016106, filed on Apr. 20, 2021.

(51) Int. Cl.
*H04L 9/00* (2022.01)
*H04L 9/32* (2006.01)

(52) U.S. Cl.
CPC .............. *H04L 9/50* (2022.05); *H04L 9/3239* (2013.01); *H04L 9/3297* (2013.01)

(58) Field of Classification Search
CPC .................... G06Q 20/00–425; H04L 9/00–50
See application file for complete search history.

(56) References Cited

U.S. PATENT DOCUMENTS

2019/0251555 A1     8/2019   Mccormick et al.
2020/0409940 A1 *  12/2020   Gu ...................... G06F 11/3006
(Continued)

FOREIGN PATENT DOCUMENTS

| CN | 112435030 | 3/2021 |
| JP | 2020-047104 | 3/2020 |
| WO | 2020/255382 | 12/2020 |

OTHER PUBLICATIONS

EESR—Extended European Search Report dated Mar. 21, 2024 for corresponding European Patent Application No. 21937861.9 [10 pages]. ** Remaining references cited in the EESR were previously submitted in the IDS filed on Sep. 20, 2023.

(Continued)

*Primary Examiner* — Mohammad A. Nilforoush
(74) *Attorney, Agent, or Firm* — Fujitsu Intellectual Property Center

(57)                ABSTRACT

A control method including: acquiring state data corresponding a current state from a first blockchain network managing a first distributed ledger, wherein parameters relating to a series of transactions executed via a plurality of blockchain networks, a procedure of the transactions corresponding to the current state of the series of transactions, and a condition relating to a state transition in the series of transactions are defined in the first distributed ledger; transmitting an execution instruction for the transactions corresponding to the current state to the blockchain networks included in the plurality of blockchain networks; and determining a state transition destination of the current state of the series of transactions by linking with the first blockchain network, based on the condition defined in the acquired state data, when a result of processing the transmitted execution instruction for the transactions in the blockchain networks of the plurality of blockchain networks is received.

9 Claims, 17 Drawing Sheets

(56)          References Cited

U.S. PATENT DOCUMENTS

2021/0035212 A1    2/2021  Chan et al.
2022/0051235 A1    2/2022  Ohashi et al.

OTHER PUBLICATIONS

International Search Report and English-language Translation of relevant part of ISR along with Written Opinion, mailed Jul. 20, 2021, in connection with application No. PCT/JP2021/016106.
S. Fujimoto et al., "Proposal of secure interwork between blockchains", SCIS 2018, pp. 1-9, Jan. 2018 (see International Search Report at NPL Cite 01 for relevance).
CNOA—Chinese Office Action dated May 20, 2026 for corresponding Chinese Patent Application No. 202180096679.7 with English Translation (21 pages). U.S. Pat. No. 20200409940A1 discussed in CNOA was previously cited by the Examiner on Oct. 2, 2025.

* cited by examiner

```
{
  "scenariId":"usd-jpy-ex01-pay",
  "stateId":"ST_CHECK_BALANCE",
  "tradeId":"tr20210214201311200",
  "runtimeParams":{
    "senderId":"D-Alice",
    "receiverId":"Y-Bob",
    "jpyAmount": 1300,
  },
  "operation":{
    "operationType":"syncOp",
    "targetChain":"Dcoin",
    "scId":"0x25353b35bd2312a5",
      "func":"getBalance",
      "args":[{"rParams":"@senderId"},···]
  },
  "scrpt":"function evaluator(t,_)
{t.type==EV_SYNCREQ_RETURNED&&(t.status==SYNCREQ_
ST_OK?t.return>@usdAmount&&nextState(ST_MONEY_TRAN
SFER1):nextState(ST_ABORT_NO_ACCOUNT))}¥r¥n"
  },
}
```

SET PARAMETER INCLUDED IN START REQUEST

SET SC "getBalance" USED FOR TRANSACTION PARAMETER CAN BE SET IN VARIABLE FOR BANK ACCOUNT NUMBER CONDITIONS FOR STATE TRANSITION: IF BALANCE IS INSUFFICIENT, SERIES OF TRANSACTIONS WILL BE ABORTED IF BALANCE IS SUFFICIENT, TRANSITION TO NEXT STATE "ST_MONEY_TRANSFER" WILL BE MADE

Figure 12:
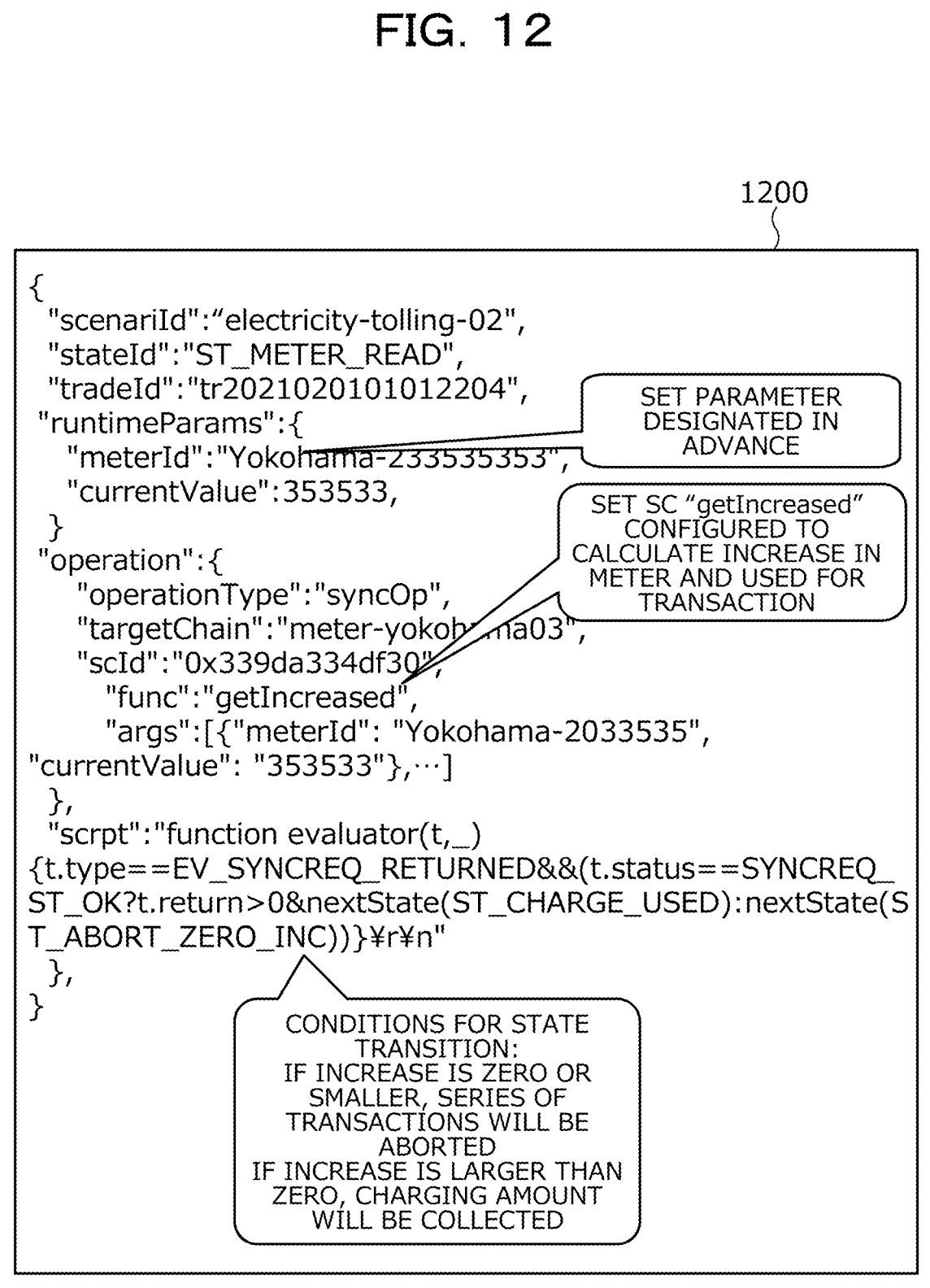

```
{
  "scenariId":"electricity-tolling-02",
  "stateId":"ST_METER_READ",
  "tradeId":"tr2021020101012204",
 "runtimeParams":{
    "meterId":"Yokohama-2333535353",
    "currentValue":353533,
 }
 "operation":{
    "operationType":"syncOp",
    "targetChain":"meter-yokohama03",
    "scId":"0x339da334df30",
     "func":"getIncreased",
     "args":[{"meterId": "Yokohama-2033535",
"currentValue": "353533"},...]
 },
 "scrpt":"function evaluator(t,_)
{t.type==EV_SYNCREQ_RETURNED&&(t.status==SYNCREQ_
ST_OK?t.return>0&nextState(ST_CHARGE_USED):nextState(S
T_ABORT_ZERO_INC))}¥r¥n"
 },
}
```

> SET PARAMETER DESIGNATED IN ADVANCE

> SET SC "getIncreased" CONFIGURED TO CALCULATE INCREASE IN METER AND USED FOR TRANSACTION > CONDITIONS FOR STATE TRANSITION:
> IF INCREASE IS ZERO OR SMALLER, SERIES OF TRANSACTIONS WILL BE ABORTED
> IF INCREASE IS LARGER THAN ZERO, CHARGING AMOUNT WILL BE COLLECTED

FIG. 17

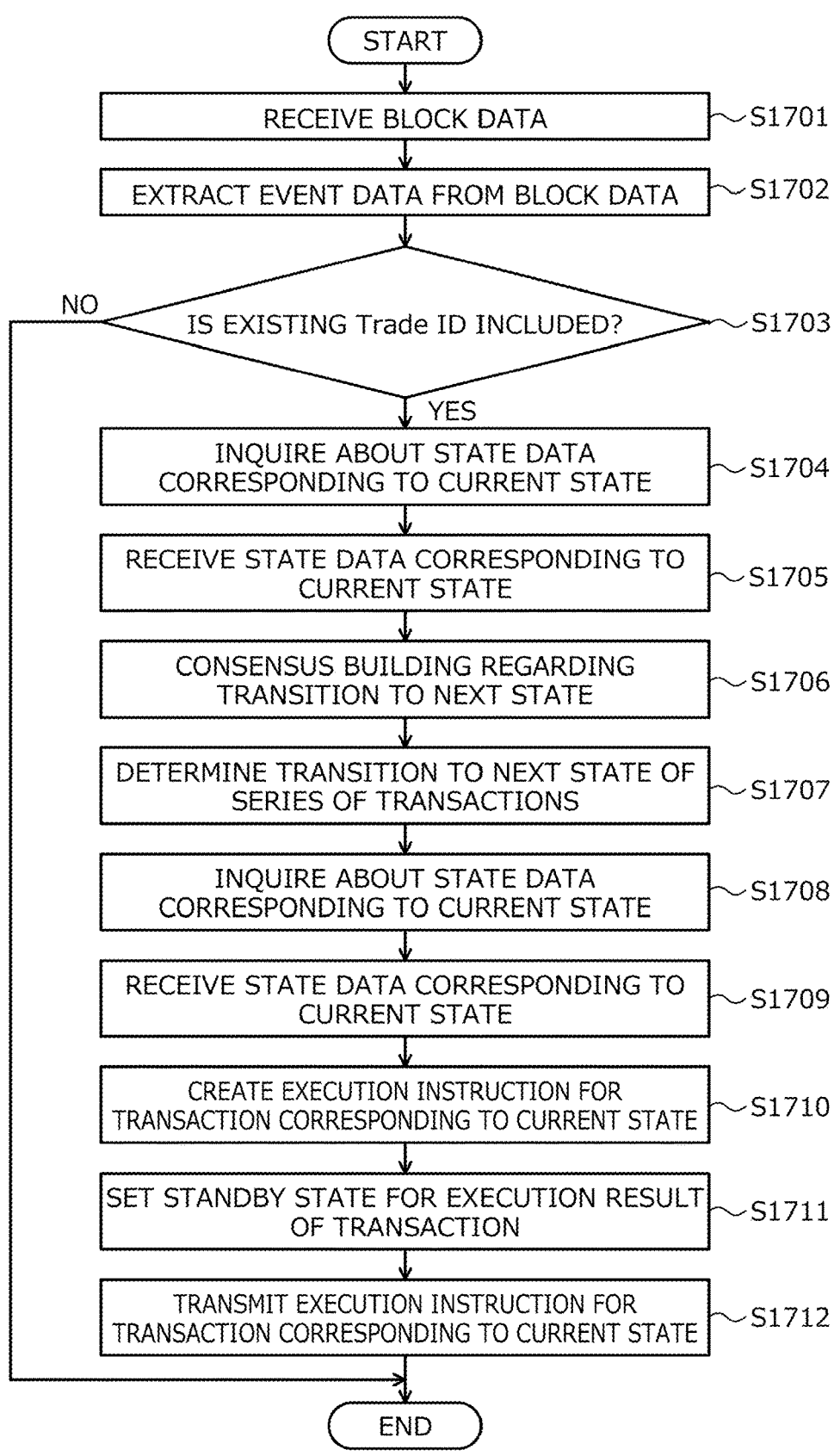

START

RECEIVE BLOCK DATA ~S1701

EXTRACT EVENT DATA FROM BLOCK DATA ~S1702

IS EXISTING Trade ID INCLUDED? ~S1703

NO

YES

INQUIRE ABOUT STATE DATA CORRESPONDING TO CURRENT STATE ~S1704

RECEIVE STATE DATA CORRESPONDING TO CURRENT STATE ~S1705

CONSENSUS BUILDING REGARDING TRANSITION TO NEXT STATE ~S1706

DETERMINE TRANSITION TO NEXT STATE OF SERIES OF TRANSACTIONS ~S1707

INQUIRE ABOUT STATE DATA CORRESPONDING TO CURRENT STATE ~S1708

RECEIVE STATE DATA CORRESPONDING TO CURRENT STATE ~S1709

CREATE EXECUTION INSTRUCTION FOR TRANSACTION CORRESPONDING TO CURRENT STATE ~S1710

SET STANDBY STATE FOR EXECUTION RESULT OF TRANSACTION ~S1711

TRANSMIT EXECUTION INSTRUCTION FOR TRANSACTION CORRESPONDING TO CURRENT STATE ~S1712

END

CONTROL METHOD, NON-TRANSITORY COMPUTER-READABLE RECORDING MEDIUM STORING CONTROL PROGRAM, AND INFORMATION PROCESSING DEVICE

CROSS-REFERENCE TO RELATED APPLICATION

This application is a continuation application of International Application PCT/JP2021/016106 filed on Apr. 20, 2021 and designated the U.S., the entire contents of which are incorporated herein by reference.

FIELD

The present disclosure relates to a control method, a non-transitory computer-readable recording medium storing a control program, and an information processing device.

BACKGROUND

Conventionally, it is sometimes desired that a series of transactions are executed via a plurality of blockchain networks, such as a case where there is a plurality of blockchain networks that each manage an asset of a user, and the assets managed by different blockchain networks are exchanged. In relation to this, a system in which a relay server links a plurality of blockchain networks to execute a series of transactions in a centralized manner is conceivable. For example, it is conceivable that the relay server records a transaction identifier (ID) that identifies the executed transaction and a time stamp in association with each other, thereby executing a series of transactions while keeping a trail of the executed transaction.

As a prior technique, for example, there is a smart contract that verifies an electronic signature using a payment amount and a template of a transaction. In addition, for example, there is a technique of generating a blockchain network for generation and processing of a standby guaranteed resource and identifying one or more related parties of a transaction to permit access to a distributed ledger correlated with the generation and processing of the standby guaranteed resource.

Examples of the related art include: [Patent Document 1] Japanese Laid-open Patent Publication No. 2020-047104; and [Patent Document 2] U.S. Patent Application Publication No. 2019/0251555.

SUMMARY

According to an aspect of the embodiments, there is provided a control method implemented by a computer, the control method including: acquiring, from a first blockchain network that manages a first distributed ledger, state data that corresponds to a current state, the first distributed ledger being configured to record the state data that corresponds to the current state, wherein parameters that relate to a series of transactions executed via a plurality of blockchain networks, a procedure of the transactions that correspond to the current state of the series of transactions, and a condition that relates to a state transition in the series of transactions are defined in the first distributed ledger; transmitting an execution instruction for the transactions that correspond to the current state, which has been created by assigning any of the parameters defined in the acquired state data to the procedure of the transactions that correspond to the current state, which is defined in the acquired state data, to the blockchain networks included in the plurality of blockchain networks; and determining a state transition destination of the current state of the series of transactions by linking with the first blockchain network, based on the condition defined in the acquired state data, when a result of processing the transmitted execution instruction for the transactions in the blockchain networks included in the plurality of blockchain networks is received.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is an explanatory diagram (part 2) illustrating an example of the working of the transaction control system 200 in a case where the information processing device 100 receives a start request for a series of transactions;

FIG. 12 is an explanatory diagram (part 2) illustrating an example of the working of the transaction control system 200 in a case where the information processing device 100 receives block data;

FIG. 17 is a flowchart illustrating an example of a state transition processing procedure.

DESCRIPTION OF EMBODIMENTS

However, in the conventional techniques, it is difficult to ensure transparency or neutrality of the executed transaction. For example, since the relay server executes a series of transactions in a centralized manner, transparency or neutrality of each executed transaction may not be ensured.

In one aspect, the present disclosure aims to ensure transparency or neutrality of a transaction.

Hereinafter, embodiments of a control method, a control program, and an information processing device according to the present disclosure will be described in detail with reference to the drawings.

(Working Example of Control Method According to Embodiment)

Figure 1:
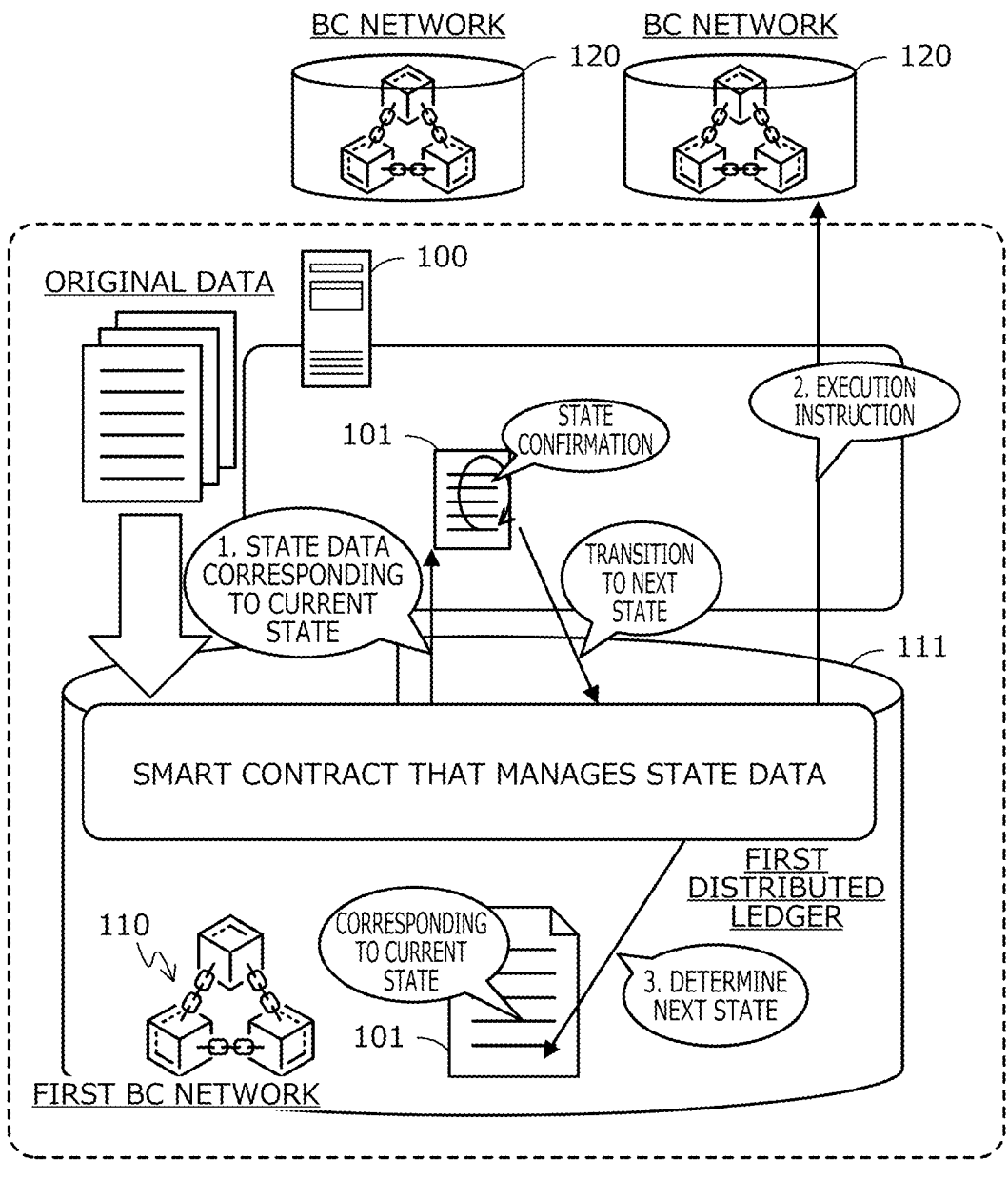
FIG. 1 is an explanatory diagram illustrating a working example of a control method according to an embodiment.

FIG. 1 is an explanatory diagram illustrating a working example of a control method according to an embodiment. An information processing device 100 is a computer for linking a plurality of blockchain networks so as to be able to execute a series of transactions via the plurality of block-chain networks. In the following descriptions, a blockchain will be sometimes referred to as a "BC".

Specifically, it is conceivable that the plurality of BC networks is BC networks that each manage an asset of a user. It is conceivable that the series of transactions is specifically a series of transactions for exchanging assets between different users.

Conventionally, it is desired to enable to execute a series of transactions via a plurality of BC networks, such as exchanging assets managed by different BC networks.

In relation to this, for example, in order to enable to execute a series of transactions via a plurality of BC networks, a relay server capable of communicating with the plurality of BC networks is prepared in some cases. Then, a system in which the relay server enables to execute a series of transactions by an application, by linking the plurality of BC networks, is conceivable.

In this approach, it is conceivable that the relay server records a transaction ID that identifies the executed transaction and a time stamp in a linkage-dedicated BC network in association with each other, thereby executing the series of transactions while keeping a trail of the executed transaction.

However, in this approach, there is a disadvantage that it is difficult to ensure transparency or neutrality of a transaction because the relay server enables to execute the series of transactions in a centralized manner by an application. The transparency means, for example, that it is possible to check how the relay server is causing the series of transactions to be executed. The neutrality means, for example, that it is possible to check that the relay server has executed the series of transactions.

In addition, the BC networks sometimes use different communication protocols or signature algorithms from each other. In addition, parameters different from each other are sometimes set in the BC networks. Therefore, it is difficult in some cases for the relay server to execute the series of transactions by linking the plurality of BC networks.

In addition, for example, in order to enable to execute a series of transactions via a plurality of BC networks, an approach called Atomic Swap using hashed time locked contracts (HTLC) is conceivable. This approach enables to execute a series of transactions via a plurality of BC networks by assigning an electronic key unlockable with the same passcode to each asset to be exchanged.

However, in order to use HTLC, a target BC network is supposed to adopt a transaction approval scheme called a multi-signature, and there is a disadvantage that the number of BC networks satisfying this condition is small and it is difficult to implement.

Accordingly, in the present embodiment, a control method capable of enabling to execute a series of transactions via a plurality of BC networks and also ensuring transparency or neutrality of a transaction included in the series of transactions will be described.

In FIG. 1, the information processing device 100 can communicate with a first BC network 110. The first BC network 110 is formed by, for example, a plurality of nodes. The information processing device 100 can communicate with a plurality of BC networks 120. Each BC network 120 is formed by, for example, a plurality of nodes.

The first BC network 110 manages a first distributed ledger 111 that records state data 101 corresponding to the current state of a series of transactions. The series of transactions are executed via a plurality of BC networks 120. The state indicates which transaction of the series of transactions is an execution target. In the state data 101, for example, a parameter relating to the series of transactions, a procedure of a transaction corresponding to the current state, and a condition relating to a state transition in the series of transactions are defined.

The first BC network 110 has a smart contract that manages the state data 101. For example, the smart contract transmits the state data 101 corresponding to the current state to an inquirer in response to an inquiry or updates the state data 101 corresponding to the current state. In the example in FIG. 1, it is assumed that there is original data of the state data 101 corresponding to each state of the series of transactions. It is assumed that the original data is recorded in the first distributed ledger 111 in a verifiable manner, for example.

The information processing device 100 acquires the state data 101 corresponding to the current state from the first BC network 110. For example, the information processing device 100 acquires the state data 101 corresponding to the current state, by inquiring of the first BC network 110 about the state data 101 corresponding to the current state and receiving the state data 101 from the first BC network 110.

This allows the information processing device 100 to enable to specify which transaction of the series of transactions is an execution target in the current state. In addition, the information processing device 100 is allowed to enable to specify what condition is based on to make a state transition from the current state.

(1-2) The information processing device 100 acquires an execution instruction for the transaction corresponding to the current state. For example, the information processing device 100 acquires the execution instruction for the transaction corresponding to the current state, by creating the execution instruction for the transaction corresponding to the current state by assigning any of the parameters defined in the state data 101 to the procedure of the transaction corresponding to the current state defined in the state data 101. The information processing device 100 transmits the acquired execution instruction for the transaction corresponding to the current state to the BC network 120 included in the plurality of BC networks 120.

This allows the information processing device 100 to cause the BC network 120 to execute the transaction corresponding to the current state among the series of transactions.

(1-3) The information processing device 100 instructs on transition to the next state by linking with the first BC network 110, based on the condition defined in the acquired state data 101, and determines the next state of the series of transactions after undergoing a consensus building process on the BC. The next state refers to a state transition destination of the current state. For example, the information processing device 100 creates a determination request for the next state of the series of transactions, based on the condition defined in the acquired state data 101, and transmits the created determination request to the first BC network 110.

This allows the information processing device 100 to cause the first BC network 110 to create the state data 101 corresponding to the next state of the series of transactions from the original data recorded in the first distributed ledger 111. Then, the information processing device 100 is allowed to cause the first BC network 110 to set the created state data 101 as new state data 101 corresponding to the current state and record the set new state data 101 in the first distributed ledger 111.

In this manner, the information processing device 100 can accumulate the state data 101 in which the procedure of the transaction that has been executed, among the series of transactions, is defined in the first distributed ledger 111 in a state in which falsification is difficult, by linking with the first BC network 110. Therefore, the information processing device 100 can enable to verify what kind of transaction has been executed afterwards and may make it easy to ensure transparency and neutrality.

In addition, since the original data of the state data 101 corresponding to each state of the series of transactions is verifiable, the information processing device 100 can enable to verify how the series of transactions is to be executed and may make it easy to ensure transparency and neutrality. In addition, the information processing device 100 can enable to execute the series of transactions via the plurality of BC networks 120 even when a technique called multi-signature is not equipped in the BC networks 120.

Here, a case where the information processing device 100 once acquires the state data 101 corresponding to the current state from the first BC network 110, then transmits the execution instruction for the transaction corresponding to the current state, and determines the next state of the series of transactions has been described, but the information processing device 100 is not limited to this. For example, there may be a case where the information processing device 100 transmits the execution instruction for the transaction corresponding to the current state, then acquires the state data 101 corresponding to the current state again after accepting the execution result of the transaction corresponding to the current state, and determines the next state of the series of transactions.

Here, a case where the information processing device 100 is a computer different from the node forming the first BC network 110 has been described, but the information processing device 100 is not limited to this. For example, there may be a case where the information processing device 100 is a computer that also works as a node forming the first BC network 110.

Example of Transaction Control System 200

Next, an example of a transaction control system 200 to which the information processing device 100 illustrated in FIG. 1 is applied will be described with reference to FIG. 2.

Figure 2:
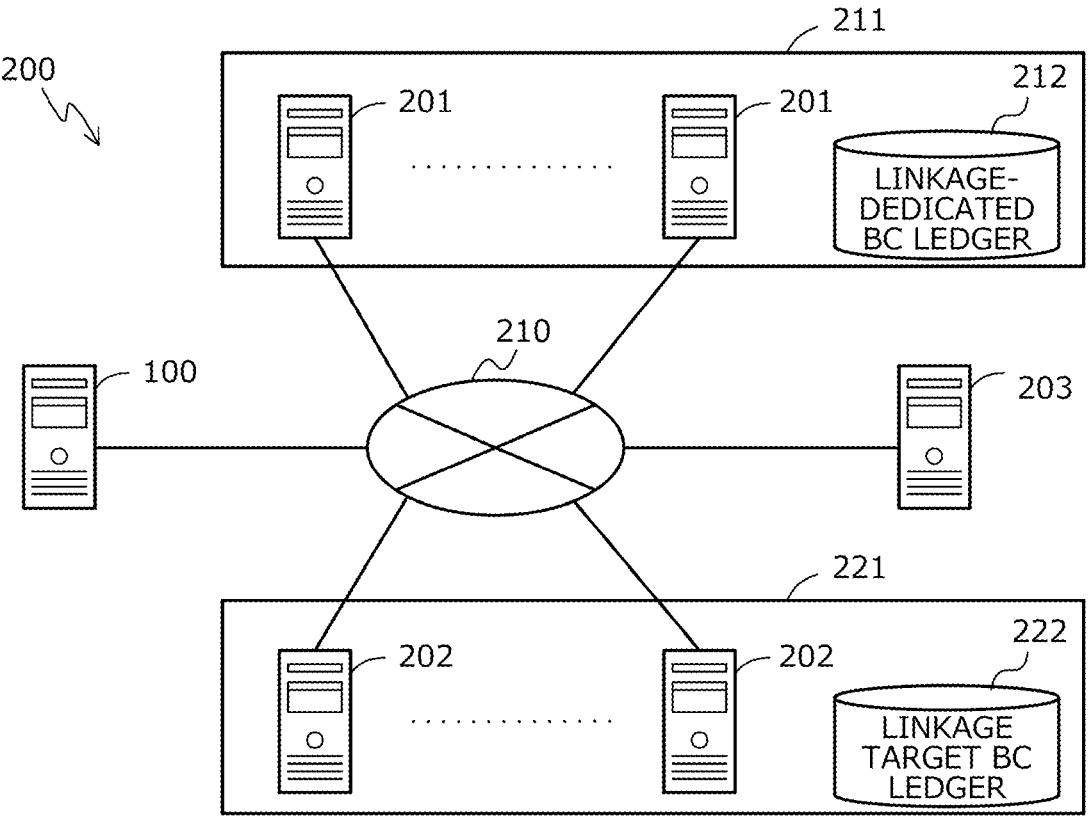
FIG. 2 is an explanatory diagram illustrating an example of a transaction control system 200.

FIG. 2 is an explanatory diagram illustrating an example of the transaction control system 200. In FIG. 2, the transaction control system 200 includes an information processing device 100, one or more linkage-dedicated nodes 201 forming a linkage-dedicated BC network 211, one or more linkage target nodes 202 forming a linkage target BC network 221, and a user terminal 203.

In the transaction control system 200, the information processing device 100 and the linkage-dedicated node 201 are coupled via a wired or wireless network 210. For example, the network 210 is a local area network (LAN), a wide area network (WAN), the Internet, or the like. In addition, the information processing device 100 and the linkage target node 202 are coupled via the wired or wireless network 210.

(2-1) The information processing device 100 acquires parameters relating to a series of transactions at the start of the series of transactions. For example, the information processing device 100 acquires a start request for the series of transactions including the parameters relating to the series of transactions by receiving the start request from the user terminal 203. When the parameters are acquired, the information processing device 100 causes the linkage-dedicated BC network 211 to record the state data corresponding to an initial state of the series of transactions and including the acquired parameters, as state data corresponding to a current state, in the linkage-dedicated BC ledger 212.

(2-2) The information processing device 100 communicates with the linkage-dedicated BC network 211 and acquires the state data recorded in the linkage-dedicated BC ledger 212 and corresponding to the current state of the series of transactions. The information processing device 100 creates an execution request for the transaction corresponding to the current state of the series of transactions, based on the acquired state data, and transmits the created execution request to the linkage target BC network 221. The information processing device 100 shifts to a standby state for an execution result of the transaction corresponding to the current state from the linkage target BC network 221 and waits for an execution result of the transaction corresponding to the current state.

(2-3) When accepting an execution result of the transaction corresponding to the current state in the standby state, the information processing device 100 communicates with the linkage-dedicated BC network 211 and acquires the state data recorded in the linkage-dedicated BC ledger 212 and corresponding to the current state of the series of transactions. The information processing device 100 transmits a determination request for the next state of the series of transactions to the linkage-dedicated BC network 211, based on the acquired state data and the accepted execution result of the transaction corresponding to the current state. This allows the information processing device 100 to causes the linkage-dedicated BC network 211 to determine the next state of the series of transactions and record the state data corresponding to the next state in the linkage-dedicated BC ledger 212 as the state data corresponding to the current state.

(2-4) By repeating (2-2) and (2-3), the information processing device 100 can cause the linkage target BC network 221 to sequentially execute the transactions included in the series of transactions until the series of transactions ends. For example, the information processing device 100 is a server, a personal computer (PC), or the like.

The linkage-dedicated node 201 is a computer forming the linkage-dedicated BC network 211. The linkage-dedicated node 201 provides the information processing device 100 with the state data recorded in the linkage-dedicated BC ledger 212 and corresponding to the current state of the series of transactions. The linkage-dedicated node 201 communicates with the information processing device 100 and updates the state data recorded in the linkage-dedicated BC ledger 212 and corresponding to the current state of the series of transactions. The linkage-dedicated BC network 211 corresponds to the first BC network 110 illustrated in FIG. 1. For example, the linkage-dedicated node 201 is a server, a PC, or the like.

The linkage target node 202 is a computer that forms the linkage target BC network 221. The linkage target node 202 communicates with the information processing device 100 and executes a transaction included in the series of transactions. The transaction is executed, for example, by being recorded in a linkage target BC ledger 222. The linkage target node 202 transmits the execution result of the transaction included in the series of transactions to the information processing device 100. The linkage target BC network 221 corresponds to the BC network 120 illustrated in FIG. 1. For example, the linkage target node 202 is a server, a PC, or the like.

The user terminal 203 is a computer owned by a user of the transaction control system 200. The user terminal 203 creates a start request for the series of transactions including the parameters relating to the series of transactions, based on an operation input from the user, and transmits the created start request to the information processing device 100. For example, the user terminal 203 is a server, a PC, a tablet terminal, a smartphone, or the like.

Here, a case where the transaction control system 200 includes the user terminal 203 has been described, but the transaction control system 200 is not limited to this. For example, there may be a case where the transaction control system 200 does not include the user terminal 203.

In addition, here, a case where the information processing device 100 is a device different from the linkage-dedicated node 201 has been described, but the information processing device 100 is not limited to this. For example, there may be a case where the information processing device 100 also works as the linkage-dedicated node 201.

In addition, here, a case where the information processing device 100 is a device different from the linkage target node 202 has been described, but the information processing device 100 is not limited to this. For example, there may be a case where the information processing device 100 works as the linkage target node 202.

(Hardware Configuration Example of Information Processing Device 100)

Next, a hardware configuration example of the information processing device 100 will be described with reference to FIG. 3.

Figure 3:
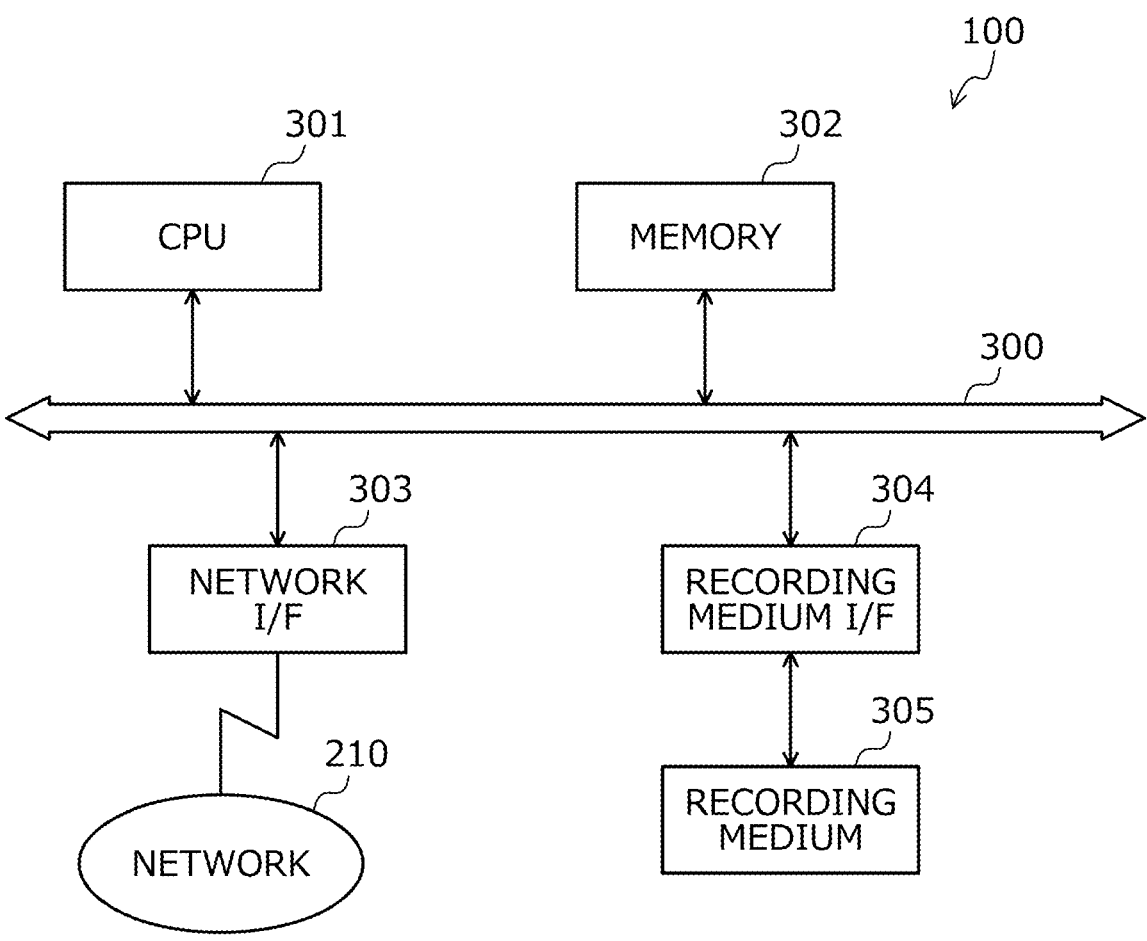
FIG. 3 is a block diagram illustrating a hardware configuration example of an information processing device 100.

FIG. 3 is a block diagram illustrating a hardware configuration example of the information processing device 100. In FIG. 3, the information processing device 100 includes a central processing unit (CPU) 301, a memory 302, a network interface (I/F) 303, a recording medium I/F 304, and a recording medium 305. In addition, the individual components are coupled to each other by a bus 300.

Here, the CPU 301 takes overall control of the information processing device 100. For example, the memory 302 includes a read only memory (ROM), a random access memory (RAM), a flash ROM, and the like. Specifically, for example, the flash ROM or the ROM stores various programs, and the RAM is used as a work area for the CPU 301. The programs stored in the memory 302 are loaded into the CPU 301 to cause the CPU 301 to execute coded processing.

The network I/F 303 is coupled to the network 210 through a communication line and is coupled to another computer via the network 210. Then, the network I/F 303 takes control of an interface between the network 210 and the inside and controls input and output of data from and to another computer. For example, the network I/F 303 is a modem, a LAN adapter, or the like.

The recording medium I/F 304 controls reading and writing of data from and to the recording medium 305 under the control of the CPU 301. For example, the recording medium I/F 304 is a disk drive, a solid state drive (SSD), a universal serial bus (USB) port, or the like. The recording medium 305 is a nonvolatile memory that stores data written under the control of the recording medium I/F 304. For example, the recording medium 305 is a disk, a semiconductor memory, a USB memory, or the like. The recording medium 305 may be attachable to and detachable from the information processing device 100.

For example, the information processing device 100 may include a keyboard, a mouse, a display, a printer, a scanner, a microphone, a speaker or the like, as well as the components described above. The information processing device 100 may also include a plurality of the recording medium I/Fs 304 and the recording media 305. In addition, the information processing device 100 does not have to include the recording medium I/F 304 or the recording medium 305.

(Hardware Configuration Example of Linkage-Dedicated Node 201)

Next, a hardware configuration example of the linkage-dedicated node 201 will be described with reference to FIG. 4.

Figure 4:
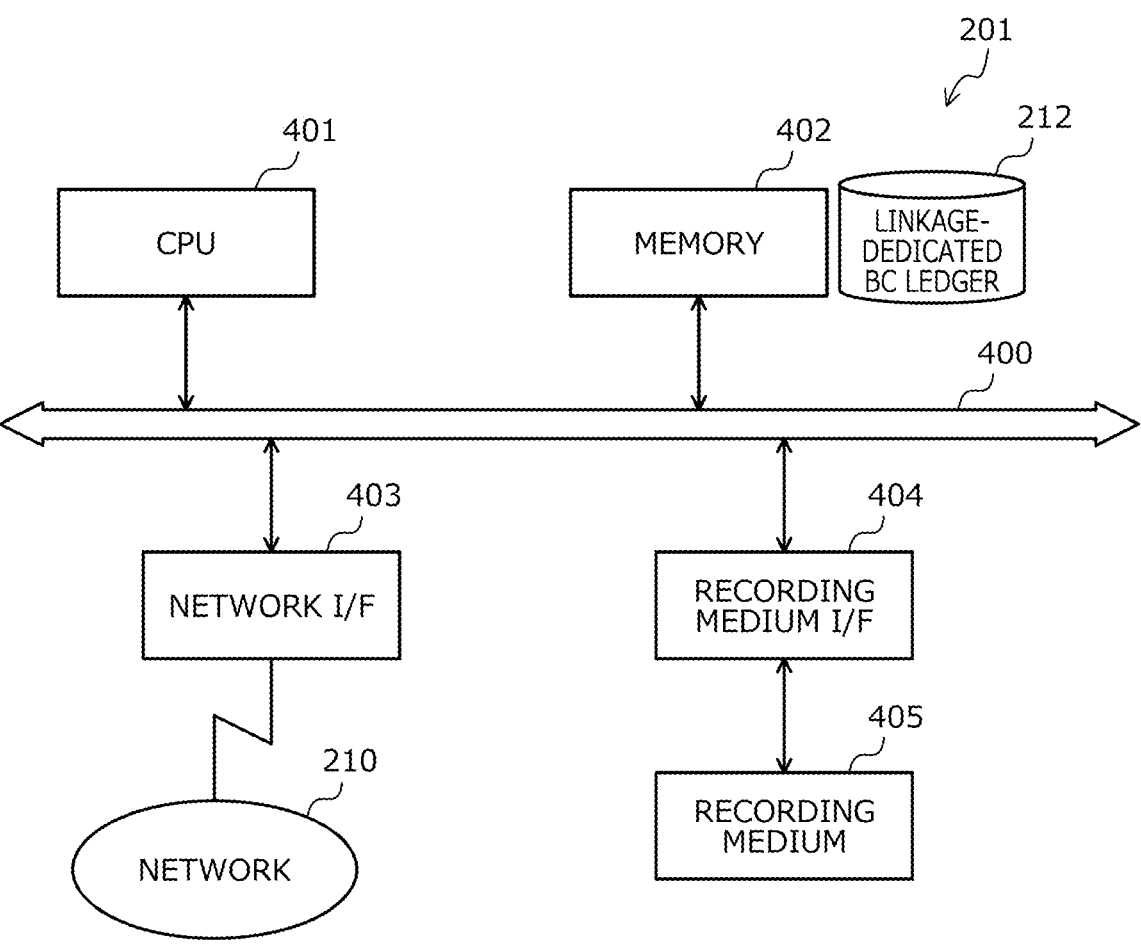
FIG. 4 is a block diagram illustrating a hardware configuration example of a linkage-dedicated node 201.

FIG. 4 is a block diagram illustrating a hardware configuration example of the linkage-dedicated node 201. In FIG. 4, the linkage-dedicated node 201 includes a CPU 401, a memory 402, a network I/F 403, a recording medium I/F 404, and a recording medium 405. In addition, the individual components are coupled to each other by a bus 400.

Here, the CPU 401 takes overall control of the linkage-dedicated node 201. For example, the memory 402 includes a ROM, a RAM, a flash ROM, and the like. Specifically, for example, the flash ROM or the ROM stores various programs, and the RAM is used as a work area for the CPU 401. The various programs include, for example, a smart contract. The programs stored in the memory 402 are loaded into the CPU 401 to cause the CPU 401 to execute coded processing. The memory 402 stores the linkage-dedicated BC ledger 212.

The network I/F 403 is coupled to the network 210 through a communication line and is coupled to another computer via the network 210. Then, the network I/F 403 takes control of an interface between the network 210 and the inside and controls input and output of data from and to another computer. For example, the network I/F 403 is a modem, a LAN adapter, or the like.

The recording medium I/F 404 controls reading and writing of data from and to the recording medium 405 under the control of the CPU 401. For example, the recording medium I/F 404 is a disk drive, an SSD, a USB port, or the like. The recording medium 405 is a nonvolatile memory that stores data written under the control of the recording medium I/F 404. For example, the recording medium 405 is a disk, a semiconductor memory, a USB memory, or the like. The recording medium 405 may be attachable to and detachable from the linkage-dedicated node 201.

For example, the linkage-dedicated node 201 may include a keyboard, a mouse, a display, a printer, a scanner, a microphone, a speaker, or the like, as well as the components described above. The linkage-dedicated node 201 may also include a plurality of the recording medium I/Fs 404 and the recording media 405. In addition, the linkage-dedicated node 201 does not have to include the recording medium I/F 404 or the recording medium 405.

Example of Recorded Contents of Linkage-Dedicated BC Ledger 212

Next, an example of the recorded contents of the linkage-dedicated BC ledger 212 will be described with reference to FIG. 5.

Figure 5:
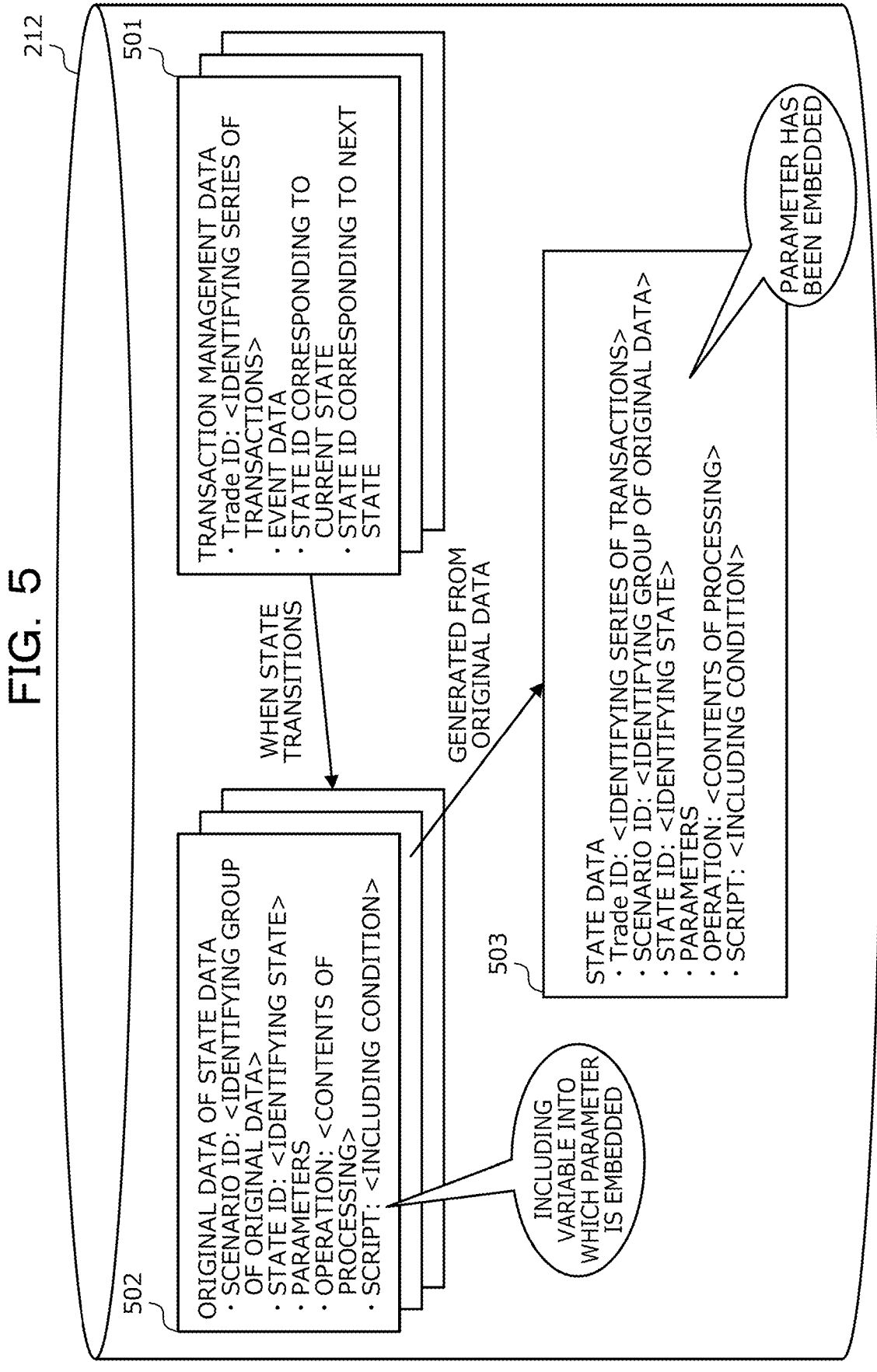
FIG. 5 is an explanatory diagram illustrating an example of the recorded contents of a linkage-dedicated blockchain (BC) ledger 212.

FIG. 5 is an explanatory diagram illustrating an example of the recorded contents of the linkage-dedicated BC ledger 212. The linkage-dedicated BC ledger 212 records, for each series of transactions, transaction management data 501 corresponding to the series of transactions. The transaction management data 501 includes, for example, a Trade ID that is identification information that identifies the series of transactions. The transaction management data 501 includes, for example, event data corresponding to an execution result of any transaction included in the series of transactions.

The transaction management data 501 includes, for example, a state ID corresponding to the current state. The transaction management data 501 includes, for example, a state ID corresponding to the next state. This allows the transaction management data 501 to enable to manage the current state of the series of transactions and to specify the state data 503 corresponding to the current state. In addition, the transaction management data 501 is allowed to enable to specify what state transition has arisen in the series of transactions.

The linkage-dedicated BC ledger 212 records original data 502 of the state data 503 corresponding to each state of the series of transactions. The original data 502 includes a scenario ID that is identification information that identifies a group of original data 502 including the original data 502. The group of original data 502 includes the original data 502 of the state data 503 corresponding to each state of the series of transactions.

The original data 502 includes a state ID that identifies one of the states of the series of transactions corresponding to the original data 502. The original data 502 includes parameters relating to the series of transactions. The original data 502 includes an operation corresponding to one of the states of the series of transactions corresponding to the original data 502. The operation represents a procedure for executing one of transactions that corresponds to one state and is regarded as an execution target in the one state of the series of transactions. The procedure may include, for example, a variable in which a parameter can be set.

The original data 502 includes a script corresponding to one of the states of the series of transactions corresponding to the original data 502. The script includes, for example, a condition for state transition. For example, in one state of the series of transactions, the script may indicate, in a specifiable manner, what form of event data is to be waited for as an execution result in response to the execution of any transaction corresponding to the one state. This allows the original data 502 to enable to generate the state data 503.

The state data 503 is created based on the original data 502 when a state transition occurs in the series of transactions. The state data 503 includes a state ID that identifies one of the states of the series of transactions corresponding to the state data 503. The state data 503 includes parameters relating to the series of transactions. The state data 503 includes an operation corresponding to one of the states of the series of transactions corresponding to the state data 503. The operation represents a procedure for executing one of transactions that corresponds to one state and is regarded as an execution target in the one state of the series of transactions. The procedure may include, for example, a variable in which a parameter can be set.

The state data 503 includes a script corresponding to one of the states of the series of transactions corresponding to the state data 503. The script includes, for example, a condition for state transition. For example, in one state of the series of transactions, the script may indicate, in a specifiable manner, what form of event data is to be waited for as an execution result in response to the execution of any transaction corresponding to the one state. This allows the state data 503 to enable to specify which state of the series of transactions the current state is. In addition, the state data 503 is allowed to enable to specify which transaction is expected to be executed in the current state and under what condition the state transitions from the current state.

Hardware Configuration Example of Linkage Target Node 202

Next, a hardware configuration example of the linkage target node 202 will be described with reference to FIG. 6.

Figure 6:
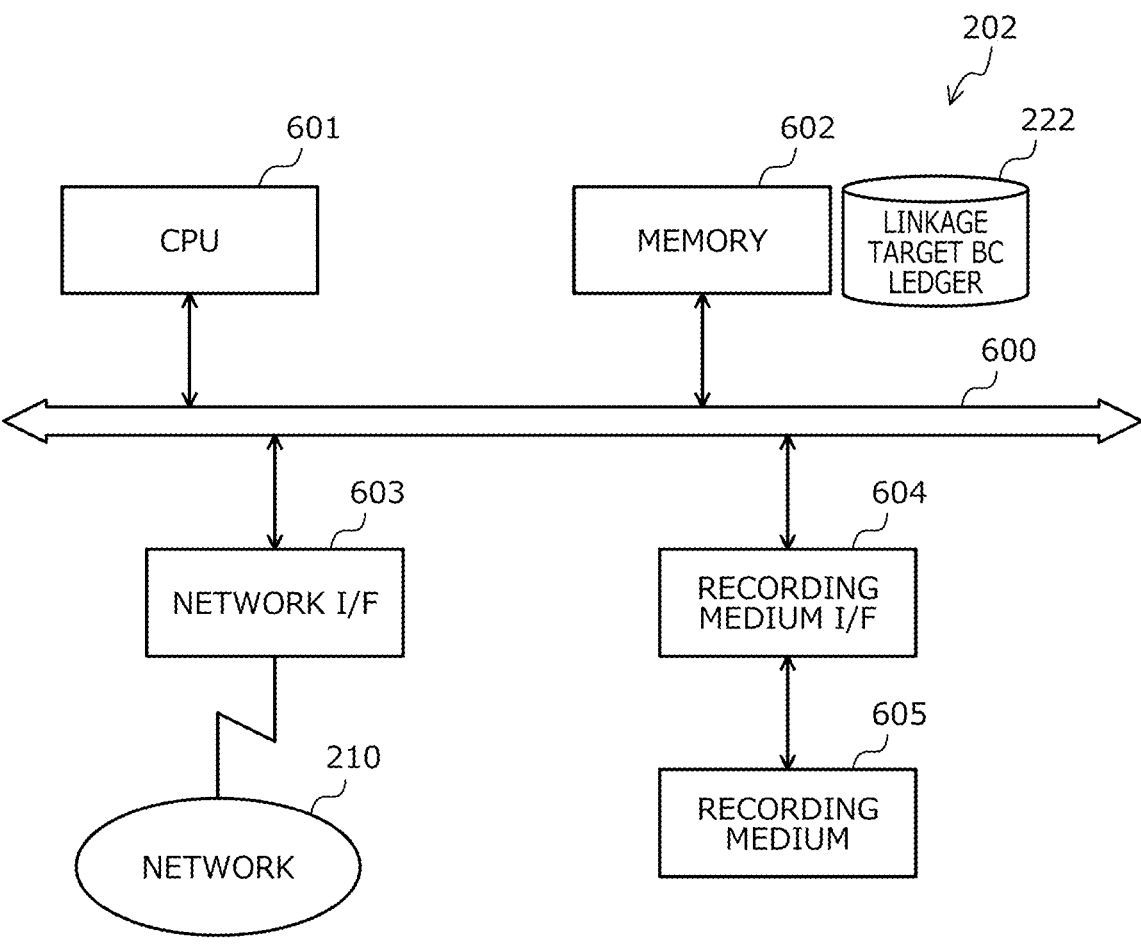
FIG. 6 is a block diagram illustrating a hardware configuration example of a linkage target node 202.

FIG. 6 is a block diagram illustrating a hardware configuration example of the linkage target node 202. In FIG. 6, the linkage target node 202 includes a CPU 601, a memory 602, a network I/F 603, a recording medium I/F 604, and a recording medium 605. In addition, the individual components are coupled to each other by a bus 600.

Here, the CPU 601 takes overall control of the linkage target node 202. For example, the memory 602 includes a ROM, a RAM, a flash ROM, and the like. Specifically, for example, the flash ROM or the ROM stores various programs, and the RAM is used as a work area for the CPU 601. The various programs include, for example, a smart contract. The programs stored in the memory 602 are loaded into the CPU 601 to cause the CPU 601 to execute coded processing. The memory 602 stores the linkage target BC ledger 222.

The network I/F 603 is coupled to the network 210 through a communication line and is coupled to another computer via the network 210. Then, the network I/F 603 takes control of an interface between the network 210 and the inside and controls input and output of data from and to another computer. For example, the network I/F 603 is a modem, a LAN adapter, or the like.

The recording medium I/F 604 controls reading and writing of data from and to the recording medium 605 under the control of the CPU 601. For example, the recording medium I/F 604 is a disk drive, an SSD, a USB port, or the like. The recording medium 605 is a nonvolatile memory that stores data written under the control of the recording medium I/F 604. For example, the recording medium 605 is a disk, a semiconductor memory, a USB memory, or the like. The recording medium 605 may be attachable to and detachable from the linkage target node 202.

For example, the linkage target node 202 may include a keyboard, a mouse, a display, a printer, a scanner, a microphone, a speaker, or the like, as well as the components described above. The linkage target node 202 may also include a plurality of the recording medium I/Fs 604 and the recording media 605. In addition, the linkage target node 202 does not have to include the recording medium I/F 604 or the recording medium 605.

Hardware Configuration Example of User Terminal 203

Specifically, since the hardware configuration example of the user terminal 203 is similar to the hardware configuration example of the information processing device 100 illustrated in FIG. 3, description thereof will be omitted.

Functional Configuration Example of Information Processing Device 100

Next, a functional configuration example of the information processing device 100 will be described with reference to FIG. 7.

Figure 7:
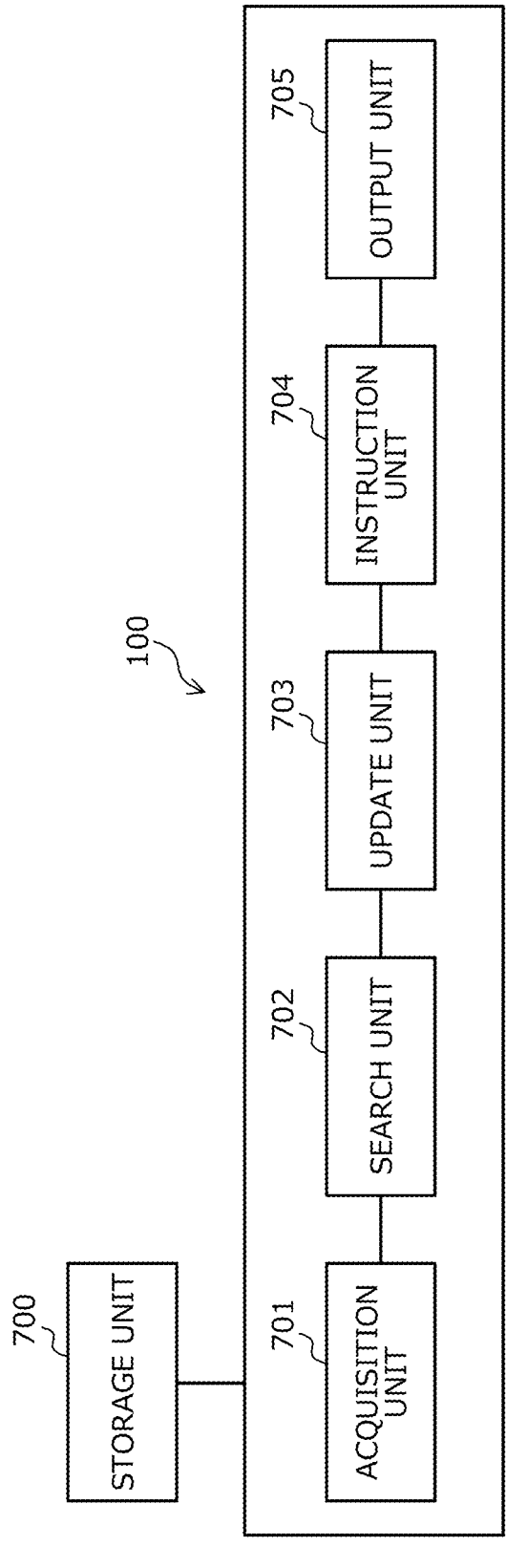
FIG. 7 is a block diagram illustrating a functional configuration example of the information processing device 100.

FIG. 7 is a block diagram illustrating a functional configuration example of the information processing device 100. The information processing device 100 includes a storage unit 700, an acquisition unit 701, a search unit 702, an update unit 703, an instruction unit 704, and an output unit 705.

The storage unit 700 is implemented by, for example, a storage area such as the memory 302 or the recording medium 305 illustrated in FIG. 3. Hereinafter, a case where the storage unit 700 is included in the information processing device 100 will be described, but the storage unit 700 is not limited to this. For example, there may be a case where the storage unit 700 is included in a device different from the information processing device 100, and the information processing device 100 is allowed to refer to the storage contents of the storage unit 700.

The acquisition unit 701 to the output unit 705 function as an example of a control unit. Specifically, the acquisition unit 701 to the output unit 705 implement functions thereof, for example, by causing the CPU 301 to execute a program stored in a storage area such as the memory 302 or the recording medium 305 or by the network I/F 303 illustrated in FIG. 3. A processing result of each functional unit is stored in, for example, a storage area such as the memory 302 or the recording medium 305 illustrated in FIG. 3.

The storage unit 700 stores various types of information referred to or updated in processing of each functional unit. The storage unit 700 stores state data corresponding to the current state in which a parameter relating to the series of transactions to be executed via a plurality of BC networks, a procedure of the transaction corresponding to the current state of the series of transactions, and a condition relating to a state transition in the series of transactions are defined.

for example, The series of transactions are a plurality of transactions for exchanging assets of users, or the like. The parameter is, for example, a value indicating how much the asset of which user is to be transferred to which another user. The state indicates which transaction of the series of transactions is an execution target. The BC network is, for example, the linkage target BC network 221.

The condition is, for example, that the transaction has been successfully executed. The condition is, for example, that the transaction has failed to be executed. The condition is, for example, that the execution result of the transaction matches a predetermined execution result. The state data defines, for example, to which state the series of transactions transition when a condition is satisfied. The state data is temporarily acquired by the acquisition unit 701, for example.

The acquisition unit 701 acquires various types of information used for processing of each functional unit. The acquisition unit 701 stores the acquired various types of information in the storage unit 700, or outputs the acquired various types of information to each functional unit. In addition, the acquisition unit 701 may output the various types of information stored in the storage unit 700 to each functional unit. The acquisition unit 701 acquires the various types of information, based on, for example, an operation input from a user. The acquisition unit 701 may receive the various types of information from, for example, a device different from the information processing device 100.

The acquisition unit 701 acquires parameters relating to the series of transactions at the start of the series of transactions. For example, at the start of the series of transactions, the acquisition unit 701 acquires parameters relating to the series of transactions by receiving the parameters from the user terminal 203 related to the series of transactions. Specifically, the acquisition unit 701 acquires a start request for the series of transactions including the parameters relating to the series of transactions by receiving the start request from the user terminal 203.

For example, at the start of the series of transactions, the acquisition unit 701 acquires the parameters relating to the series of transactions from a BC network included in the plurality of BC networks. The acquisition unit 701 acquires the event data including the parameters relating to the series of transactions, for example, by receiving the event data from a BC network included in the plurality of BC networks.

When the execution instruction for the transaction corresponding to the current state has been transmitted to a BC network included in the plurality of BC networks, the acquisition unit 701 shifts to the standby state for the execution result of the transaction corresponding to the current state. Then, the acquisition unit 701 accepts the execution result of the transaction corresponding to the current state in the standby state. The acquisition unit 701 acquires the event data including the execution result of the transaction corresponding to the current state, for example, by receiving the event data from a BC network included in the plurality of BC networks.

The acquisition unit 701 may accept a start trigger to start processing of any of the functional units. The start trigger is, for example, a predetermined operation input by a user. The start trigger may be, for example, reception of predetermined information from another computer. The start trigger may be, for example, output of predetermined information by any of the functional units.

For example, the acquisition unit 701 accepts acquisition of the parameters relating to the series of transactions, as a start trigger to start processing of the search unit 702, the update unit 703, and the instruction unit 704. For example, the acquisition unit 701 accepts acceptance of the execution result of the transaction corresponding to the current state, as a start trigger to start processing of the search unit 702, the update unit 703, and the instruction unit 704.

First, the working of the search unit 702, the update unit 703, and the instruction unit 704 in a case where the acquisition unit 701 acquires the parameters relating to the series of transactions will be described. The search unit 702 acquires the original data of the state data corresponding to the initial state of the series of transactions, from the first BC network.

The first BC network manages the first distributed ledger that records the state data corresponding to the current state. The first BC network manages the first distributed ledger by, for example, a smart contract that manages the first distributed ledger. The first distributed ledger is, for example, the linkage-dedicated BC ledger 212. The first BC network manages, for example, identification information that identifies the series of transactions in association with identification information that identifies the state data corresponding to the current state. The first BC network further manages the original data of the state data corresponding to each state of the series of transactions. The first BC network is, for example, the linkage-dedicated BC network 211.

For example, the search unit 702 inquires of the first BC network about the state data corresponding to the current state of the series of transactions. When the first BC network has no state data corresponding to the current state, the search unit 702 acquires the original data of the state data corresponding to the initial state of the series of transactions, from the first BC network. This allows the search unit 702 to enable to create the state data corresponding to the initial state of the series of transactions.

The update unit 703 transmits, to the first BC network, a recording request for the state data corresponding to the initial state, which is created by combining the acquired parameters with the acquired original data. This allows the update unit 703 to cause the first BC network to record the state data corresponding to the current state. Then, the update unit 703 can enable to execute the transaction corresponding to the initial state of the series of transactions and can enable to start the series of transactions.

The instruction unit 704 transmits the execution instruction for the transaction corresponding to the current state to a BC network included in the plurality of BC networks. The first execution instruction of the transaction corresponding to the current state is created, for example, by assigning any parameter defined in the acquired state data to the procedure of the transaction corresponding to the current state defined in the acquired state data.

For example, the instruction unit 704 creates the execution instruction for the transaction corresponding to the current state by assigning any parameter defined in the acquired state data to the procedure of the transaction corresponding to the current state defined in the acquired state data. The instruction unit 704 transmits the created execution instruction to a BC network included in the plurality of BC networks. This allows the instruction unit 704 to cause the BC network included in the plurality of BC networks to execute the transaction corresponding to the current state and to proceed with the series of transactions.

Next, the working of the search unit 702, the update unit 703, and the instruction unit 704 in a case where the acquisition unit 701 accepts the execution result of the transaction corresponding to the current state will be described. When accepting the execution result of the transaction corresponding to the current state, the search unit 702 acquires the state data corresponding to the current state of the series of transactions from the first BC network.

The search unit 702 acquires the state data corresponding to the current state from the first BC network, based on, for example, identification information that identifies the series of transactions. Specifically, the search unit 702 acquires the state data corresponding to the current state by receiving the state data from the first BC network as a result of transmitting the inquiry including the identification information that identifies the series of transactions to the first BC network. This allows the search unit 702 to enable to specify what condition is expected to be based on to make a state transition.

The update unit 703 determines the next state of the series of transactions by linking with the first BC network, based on the condition defined in the acquired state data. The next state is a state transition destination of the current state. For example, the update unit 703 determines the next state of the series of transactions by linking with the first BC network, based on the condition defined in the acquired state data and the accepted execution result. Specifically, the update unit 703 determines the next state of the series of transactions by updating the state data corresponding to the current state and recorded in the first distributed ledger, with the state data corresponding to the next state. This may allow the update unit 703 to appropriately proceed with the series of transactions.

The update unit 703 may detect that a certain period of time has elapsed without accepting the execution result of the transaction corresponding to the current state in the standby state. Then, when detecting that the certain period of time has elapsed, the update unit 703 determines the next state of the series of transactions by linking with the first BC network, based on the condition defined in the acquired state data and the result of detecting that the certain period of time has elapsed.

For example, when detecting that the certain period of time has elapsed, the update unit 703 concludes that the transaction corresponding to the current state has failed to be executed. For example, the update unit 703 determines the next state corresponding to the case where the transaction corresponding to the current state has failed to be executed. Specifically, the update unit 703 determines the next state of the series of transactions by updating the state data corresponding to the current state and recorded in the first distributed ledger, with the state data corresponding to the next state. This may allow the update unit 703 to appropriately proceed with the series of transactions.

When the next state is determined and the next state becomes the new current state, the search unit 702 acquires the state data corresponding to the current state of the series of transactions from the first BC network. The search unit 702 acquires the state data corresponding to the current state from the first BC network, based on, for example, identification information that identifies the series of transactions. Specifically, the search unit 702 acquires the state data corresponding to the current state by receiving the state data from the first BC network as a result of transmitting the inquiry including the identification information that identifies the series of transactions to the first BC network. This allows the search unit 702 to enable to specify how the transaction corresponding to the current state is expected to be executed.

The instruction unit 704 transmits the execution instruction of the transaction corresponding to the current state to a BC network included in the plurality of BC networks, based on the procedure of the transaction corresponding to the current state defined in the acquired state data. The execution instruction of the transaction corresponding to the current state is created, for example, by assigning any parameter defined in the acquired state data to the procedure of the transaction corresponding to the current state defined in the acquired state data.

For example, the instruction unit 704 creates the execution instruction for the transaction corresponding to the current state by assigning any parameter defined in the acquired state data to the procedure of the transaction corresponding to the current state defined in the acquired state data. The instruction unit 704 transmits the created execution instruction to a BC network included in the plurality of BC networks. This allows the instruction unit 704 to cause the BC network included in the plurality of BC networks to execute the transaction corresponding to the current state and to proceed with the series of transactions.

The output unit 705 outputs a processing result of at least any of the functional units. The output format includes, for example, displaying on a display, print output to a printer, transmitting to an external device by the network I/F 303, or storing in a storage area such as the memory 302 or the recording medium 305. This may allow the output unit 705 to enable to notify a user of a processing result of at least any of the functional units and to achieve improvement in convenience of the information processing device 100.

The output unit 705 outputs, for example, the fact that the transaction included in the series of transactions has been successfully executed such that the user is allowed to refer to the fact. The output unit 705 outputs, for example, the fact that the transaction included in the series of transactions has failed to be executed such that the user is allowed to refer to the fact. The output unit 705 outputs, for example, the fact that the series of transactions have been completed such that the user is allowed to refer to the fact.

Example of Working of Transaction Control System 200

Next, an example of the working of the transaction control system 200 will be described with reference to FIG. 8.

Figure 8:
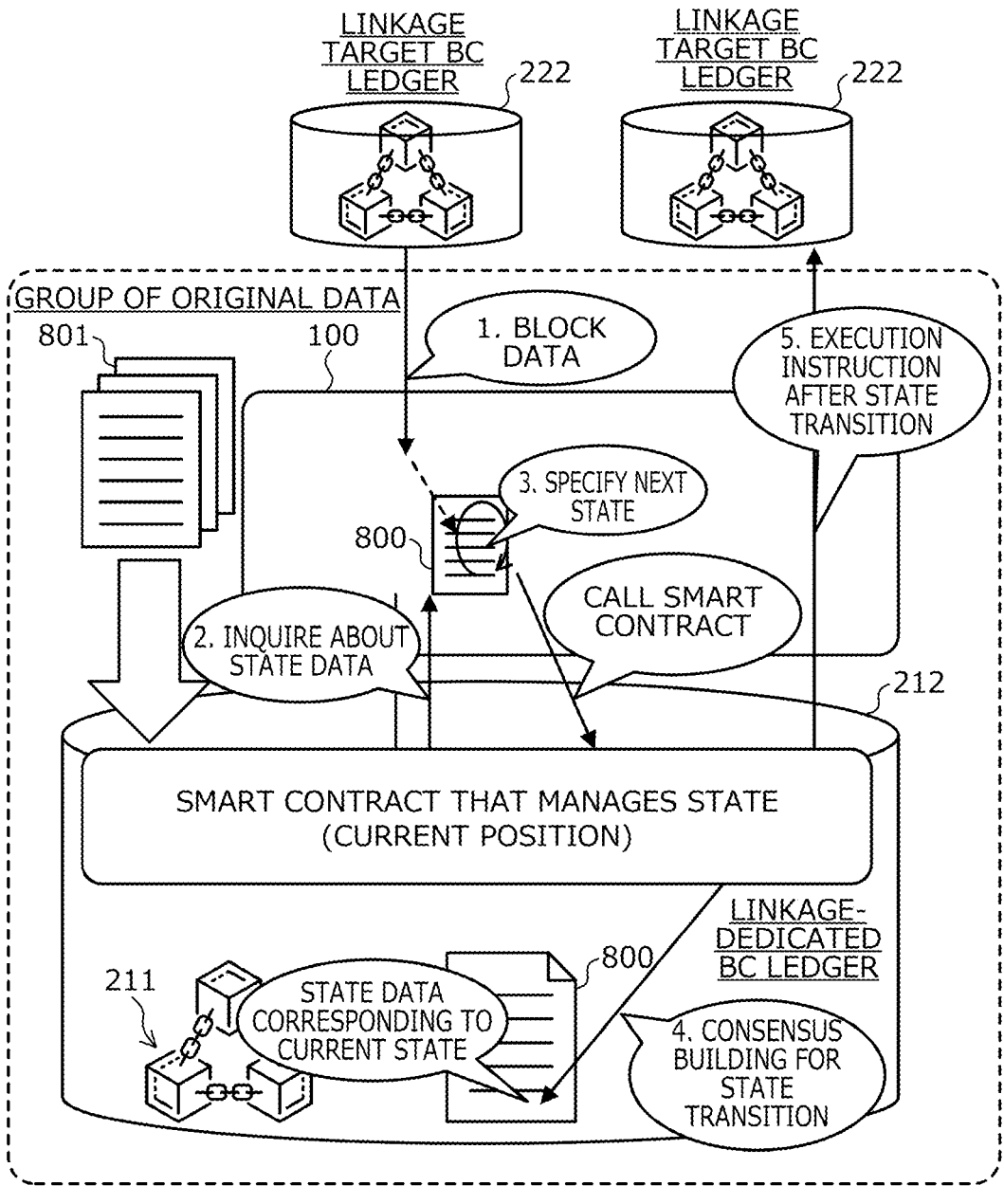
FIG. 8 is an explanatory diagram illustrating an example of the working of the transaction control system 200.

FIG. 8 is an explanatory diagram illustrating an example of the working of the transaction control system 200. In FIG. 8, it is assumed that the linkage-dedicated BC ledger 212 has recorded state data 800 corresponding to the current state. It is assumed that the information processing device 100 has caused the linkage target BC network 221 to execute the transaction corresponding to the current state of the series of transactions, based on the state data 800 corresponding to the current state. It is assumed that the information processing device 100 has shifted to the standby state for the execution result of the transaction corresponding to the current state.

(8-1) The information processing device 100 receives, in the standby state, block data including the event data that is an execution result of the transaction corresponding to the current state, from the linkage target BC network. The information processing device 100 extracts the event data from the received block data. The information processing device 100 specifies the Trade ID corresponding to the extracted event data, based on the execution result of the transaction indicated by the extracted event data.

(8-2) The information processing device 100 acquires the state data 800 corresponding to the current state by inquiring of the linkage-dedicated BC network 211 about the state data 800 corresponding to the current state, based on the specified Trade ID.

(8-3) The information processing device 100 specifies the next state of the series of transactions, based on the script included in the state data 800 corresponding to the current state and the extracted event data. The information processing device 100 calls the smart contract by transmitting a consensus request, which includes the event data and causes consensus building to be performed regarding the next state, to the linkage-dedicated BC network 211 and causes consensus building to be performed regarding the next state.

(8-4) The linkage-dedicated BC network 211 performs consensus building regarding the next state, based on the state data 800 corresponding to the current state, by the smart contract and transmits a result of performing consensus building regarding the next state to the information processing device 100. The result of performing consensus building indicates, for example, that consensus building has succeeded and the next state has been determined. There may be a case where the result of performing consensus building indicates, for example, that consensus building has failed.

When consensus building has succeeded by the smart contract, the linkage-dedicated BC network 211 records the state data 800 corresponding to the next state as the new state data 800 corresponding to the current state in the linkage-dedicated BC ledger 212. The state data 800 corresponding to the next state is created, for example, based on original data 801 of the state data 800 corresponding to the next state. The state data 800 corresponding to the next state takes over, for example, a parameter included in the state data 800 corresponding to the current state.

(8-5) The information processing device 100 receives a result of performing consensus building. If the next state has been determined based on the result of performing consensus building, the information processing device 100 inquires of the linkage-dedicated BC network 211 about the state data 800 corresponding to the current state, based on the Trade ID. The information processing device 100 acquires the state data 800 corresponding to the current state in response to the inquiry. The information processing device 100 creates execution instruction for the transaction corresponding to the current state, based on the parameters and the operation included in the state data 800 corresponding to the current state, and transmits the created execution instruction to the linkage target BC network 221.

This may allow the information processing device 100 to appropriately proceed with the series of transactions. The information processing device 100 can accumulate the state data 800 in which the procedure of the transaction that has been executed is defined, in the linkage-dedicated BC ledger 212 in a state in which falsification is difficult, by linking with the linkage-dedicated BC network 211. Therefore, the information processing device 100 can enable to verify what kind of transaction has been executed afterwards and may make it easy to ensure transparency and neutrality. In addition, since the original data 801 of the state data 800 corresponding to each state of the series of transactions is verifiable, the information processing device 100 may enable to verify how the series of transactions are to be executed and may make it easy to ensure transparency and neutrality.

(Specific Example of Working of Transaction Control System 200)

Next, an example of the working of the transaction control system 200 will be described with reference to FIGS. 9 to 14. First, an example of the working of the transaction control system 200 in a case where the information processing device 100 receives a start request for a series of transactions will be described with reference to FIGS. 9 and 10.

Figure 9:
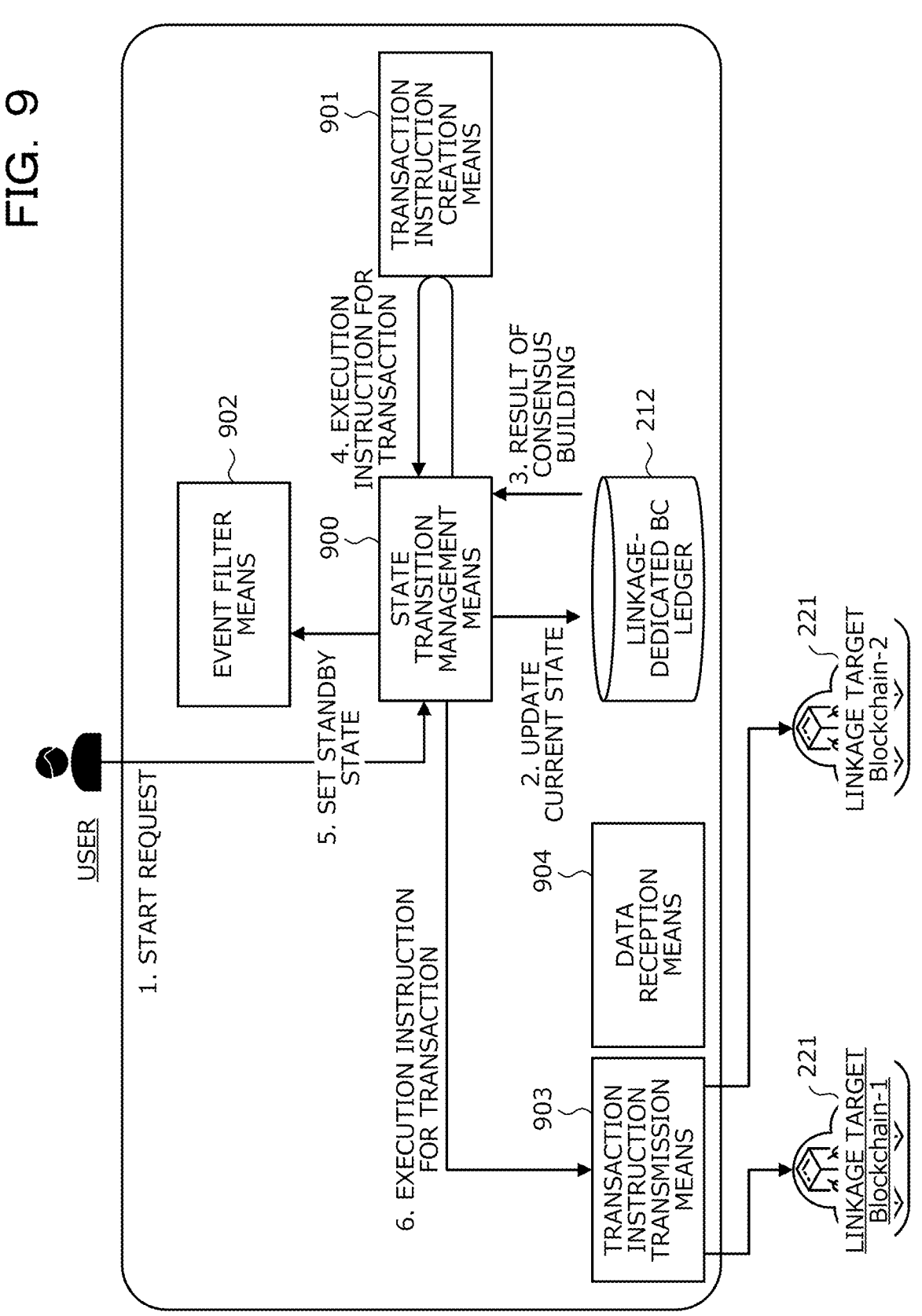
FIG. 9 is an explanatory diagram (part 1) illustrating an example of the working of the transaction control system 200 in a case where the information processing device 100 receives a start request for a series of transactions.

FIGS. 9 and 10 are explanatory diagrams illustrating an example of the working of the transaction control system 200 in a case where the information processing device 100 receives a start request for a series of transactions. In FIG. 9, the information processing device 100 includes a state transition management means 900, a transaction instruction creation means 901, an event filter means 902, a transaction instruction transmission means 903, and a data reception means 904.

(9-1) The state transition management means 900 receives, from the user terminal 203, a start request for a series of transactions including parameters relating to the series of transactions that implement asset exchange and a scenario ID that makes the original data group to be used for the series of transactions specifiable.

(9-2) When receiving the start request for the series of transactions, the state transition management means 900 transmits a creation request for the state data corresponding to the initial state, to the linkage-dedicated BC network 211, and calls the smart contract of the linkage-dedicated BC network 211. The creation request includes, for example, the parameters included in the start request and the scenario ID included in the start request.

The linkage-dedicated BC network 211 performs consensus building regarding transition to the initial state by the smart contract and, when consensus building is successful, records the state data corresponding to the initial state in the linkage-dedicated BC ledger 212. The state data corresponding to the initial state is, for example, state data 1000 illustrated in FIG. 10. Here, description of FIG. 10 will be made.

As illustrated in FIG. 10, the state data 1000 includes, for example, the scenario ID (scenarioId in the drawing). The state data 1000 includes, for example, the state ID (stateId in the drawing) indicating the correspondence to the initial state. The state data 1000 includes, for example, the Trade ID (tradeId in the drawing). The state data 1000 includes, for example, the parameters.

The state data 1000 includes, for example, the operation. The operation includes a variable in which a parameter can be set. The operation includes, for example, a type of operation and identification information capable of identifying the linkage target BC network that is to execute the transaction. The operation includes, for example, identification information that identifies the smart contract to be used for the transaction. The operation includes, for example, identification information that identifies a function to be used for the transaction. The state data 1000 includes, for example, the script. The script includes a condition for a state transition from the initial state.

Returning to the description of FIG. 9, (9-3) the state transition management means 900 acquires the result of consensus building from the linkage-dedicated BC network 211. When consensus building is successful, the state transition management means 900 inquires of the linkage-dedicated BC network 211 about the state data corresponding to the initial state and receives the state data corresponding to the initial state from the linkage-dedicated BC network 211.

(9-4) The state transition management means 900 transmits the state data corresponding to the initial state to the transaction instruction creation means 901. The transaction instruction creation means 901 creates the execution instruction for the transaction corresponding to the initial state, based on the state data corresponding to the initial state, and transmits the created execution instruction to the state transition management means 900. The state transition management means 900 receives the execution instruction for the transaction corresponding to the initial state.

(9-5) When receiving the execution instruction for the transaction corresponding to the initial state, the state transition management means 900 sets the standby state for an execution result of the transaction corresponding to the initial state in the event filter means 902. The event filter means 902 can receive the block data from the linkage target BC network 221. The event filter means 902 shifts to the standby state for the execution result, in which it is specifiable whether the event data included in the received block data is relevant to the execution result of the transaction corresponding to the initial state, based on the contents of the transaction corresponding to the initial state.

(9-6) The state transition management means 900 transmits the received execution instruction for the transaction corresponding to the initial state to the linkage target BC network 221 via the transaction instruction transmission means 903. Thereafter, the event filter means 902 will receive the block data including the event data relevant to the execution result of the transaction included in the series of transactions, from the linkage target BC network 221 via the data reception means 904.

An example of the working of the transaction control system 200 in a case where the information processing device 100 receives the block data including the event data relevant to the execution result of the transaction included in the series of transactions by the event filter means 902 will be described later with reference to FIGS. 13 and 14.

Next, an example of the working of the transaction control system 200 in a case where the information processing device 100 receives the block data will be described with reference to FIGS. 11 and 12.

Figure 11:
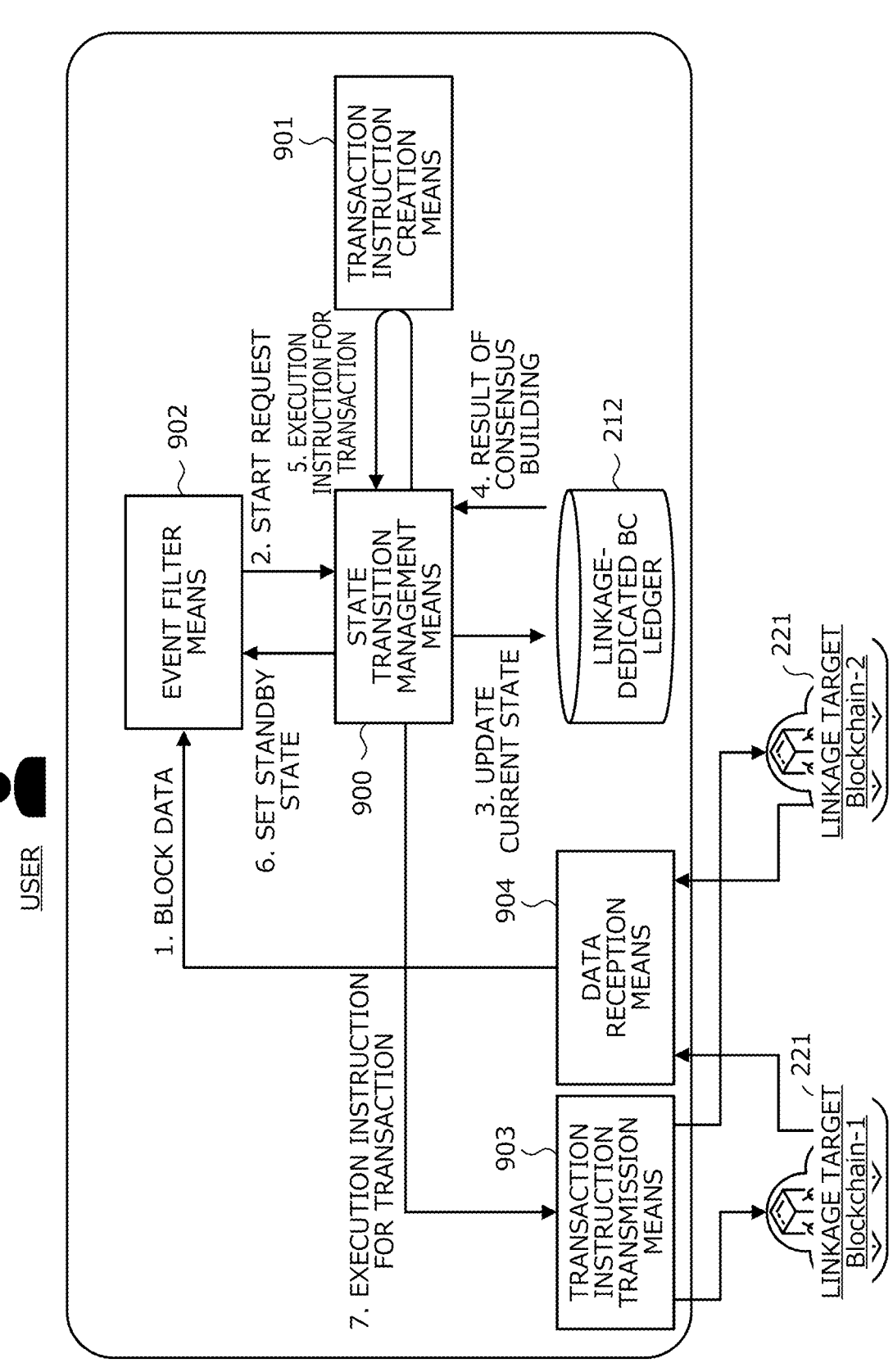
FIG. 11 is an explanatory diagram (part 1) illustrating an example of the working of the transaction control system 200 in a case where the information processing device 100 receives block data.

FIGS. 11 and 12 are explanatory diagrams illustrating an example of the working of the transaction control system 200 in a case where the information processing device 100 receives the block data. In FIG. 11, similarly to FIG. 9, the information processing device 100 includes the state transition management means 900, the transaction instruction creation means 901, the event filter means 902, the transaction instruction transmission means 903, and the data reception means 904.

The event filter means 902 is in the standby state for the block data including the event data serving as a start trigger to start the series of transactions. The event filter means 902 has, for example, the parameters relating to the series of transactions and the scenario ID that makes the original data group to be used for the series of transactions specifiable. The parameters and the scenario ID are designated in advance by an administrator, for example. The parameters may be extracted from the event data.

(11-1) The event filter means 902 receives, from the linkage target BC network 221 via the data reception means 904, block data including the event data serving as a start trigger to start the series of transactions. The event filter means 902 checks whether or not the received block data includes the event data serving as a start trigger to start the series of transactions.

(11-2) When the received block data includes the event data serving as a start trigger to start the series of transactions, the event filter means 902 transmits a start request for the series of transactions to the state transition management means 900. The start request includes, for example, the parameters relating to the series of transactions and the scenario ID that makes the original data group to be used for the series of transactions specifiable.

(11-3) When receiving the start request for the series of transactions, the state transition management means 900 transmits a creation request for the state data corresponding to the initial state, to the linkage-dedicated BC network 211, and calls the smart contract of the linkage-dedicated BC network 211. The creation request includes, for example, the parameters included in the start request and the scenario ID included in the start request.

The linkage-dedicated BC network 211 performs consensus building regarding transition to the initial state by the smart contract and, when consensus building is successful, records the state data corresponding to the initial state in the linkage-dedicated BC ledger 212. The state data corresponding to the initial state is, for example, state data 1200 illustrated in FIG. 12. Here, description of FIG. 12 will be made.

As illustrated in FIG. 12, the state data 1200 includes, for example, the scenario ID (scenarioId in the drawing). The state data 1200 includes, for example, the state ID (stateId in the drawing) indicating the correspondence to the initial state. The state data 1200 includes, for example, the Trade ID (tradeId in the drawing). The state data 1200 includes, for example, the parameters.

The state data 1200 includes, for example, the operation. The operation includes a variable in which a parameter can be set. The operation includes, for example, a type of operation and identification information capable of identifying the linkage target BC network that is to execute the transaction. The operation includes, for example, identification information that identifies the smart contract to be used for the transaction. The operation includes, for example, identification information that identifies a function to be used for the transaction. The state data 1200 includes, for example, the script. The script includes a condition for a state transition from the initial state.

Returning to the description of FIG. 11, (11-4) the state transition management means 900 acquires the result of consensus building from the linkage-dedicated BC network 211. When consensus building is successful, the state transition management means 900 inquires of the linkage-dedicated BC network 211 about the state data corresponding to the initial state and receives the state data corresponding to the initial state from the linkage-dedicated BC network 211.

(11-5) The state transition management means 900 transmits the state data corresponding to the initial state to the transaction instruction creation means 901. The transaction instruction creation means 901 creates the execution instruction for the transaction corresponding to the initial state, based on the state data corresponding to the initial state, and transmits the created execution instruction to the state transition management means 900. The state transition management means 900 receives the execution instruction for the transaction corresponding to the initial state.

(11-6) When receiving the execution instruction for the transaction corresponding to the initial state, the state transition management means 900 sets the standby state for an execution result of the transaction corresponding to the initial state in the event filter means 902. The event filter means 902 can receive the block data from the linkage target BC network 221. The event filter means 902 shifts to the standby state for the execution result, in which it is specifiable whether the event data included in the received block data is relevant to the execution result of the transaction corresponding to the initial state, based on the contents of the transaction corresponding to the initial state.

(11-7) The state transition management means 900 transmits the received execution instruction for the transaction corresponding to the initial state to the linkage target BC network 221 via the transaction instruction transmission means 903. Thereafter, the event filter means 902 will receive the block data including the event data relevant to the execution result of the transaction included in the series of transactions, from the linkage target BC network 221 via the data reception means 904.

An example of the working of the transaction control system 200 in a case where the information processing device 100 receives the block data including the event data relevant to the execution result of the transaction included in the series of transactions by the event filter means 902 will be described later with reference to FIGS. 13 and 14.

Next, an example of the working of the transaction control system 200 in a case where the information processing device 100 receives the block data including the event data relevant to the execution result of the transaction included in the series of transactions will be described with reference to FIGS. 13 and 14.

Figure 13:
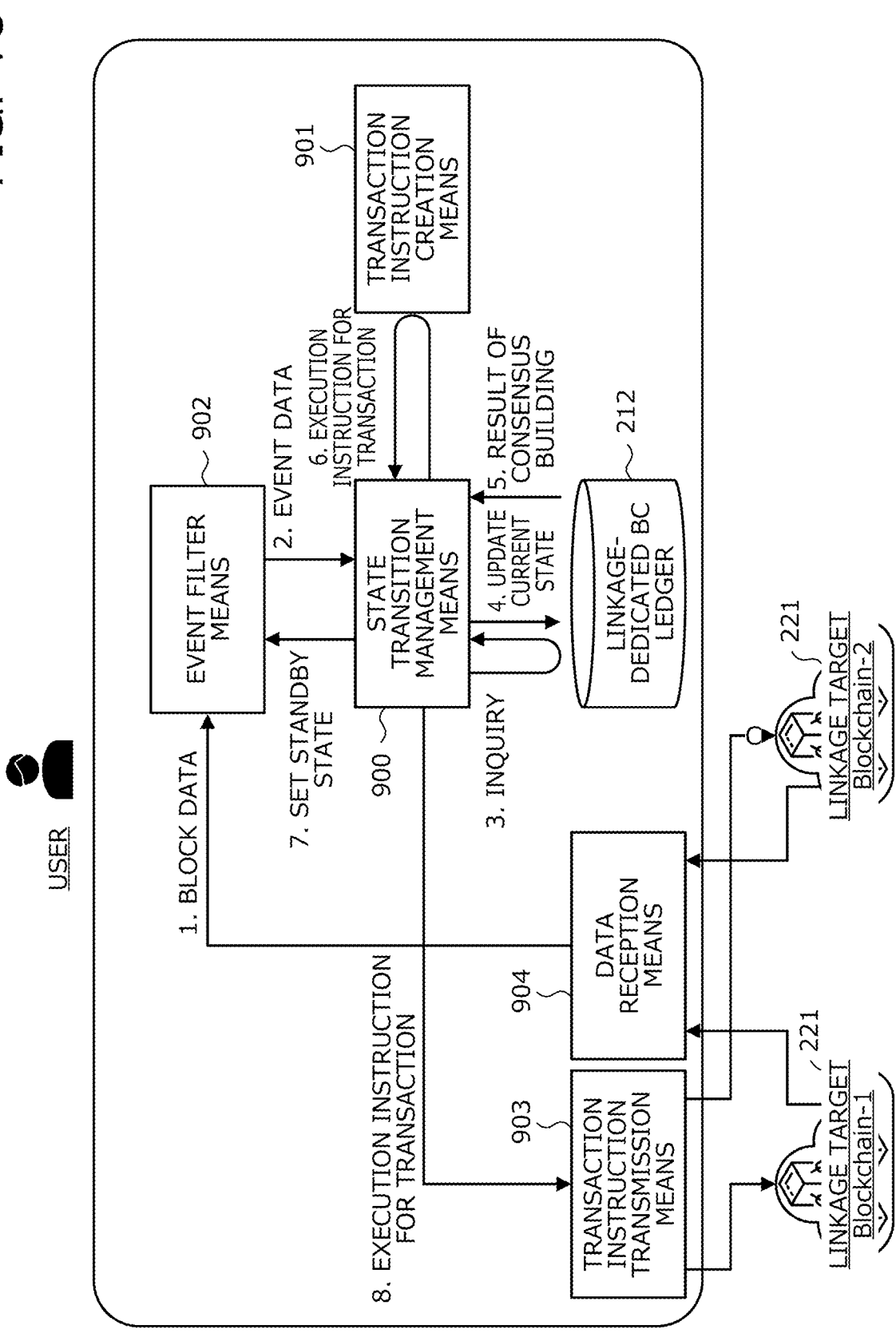
FIG. 13 is an explanatory diagram (part 1) illustrating an example of the working of the transaction control system 200 in a case where the information processing device 100 receives block data including event data relevant to an execution result of a transaction included in the series of transactions.
Figure 14:
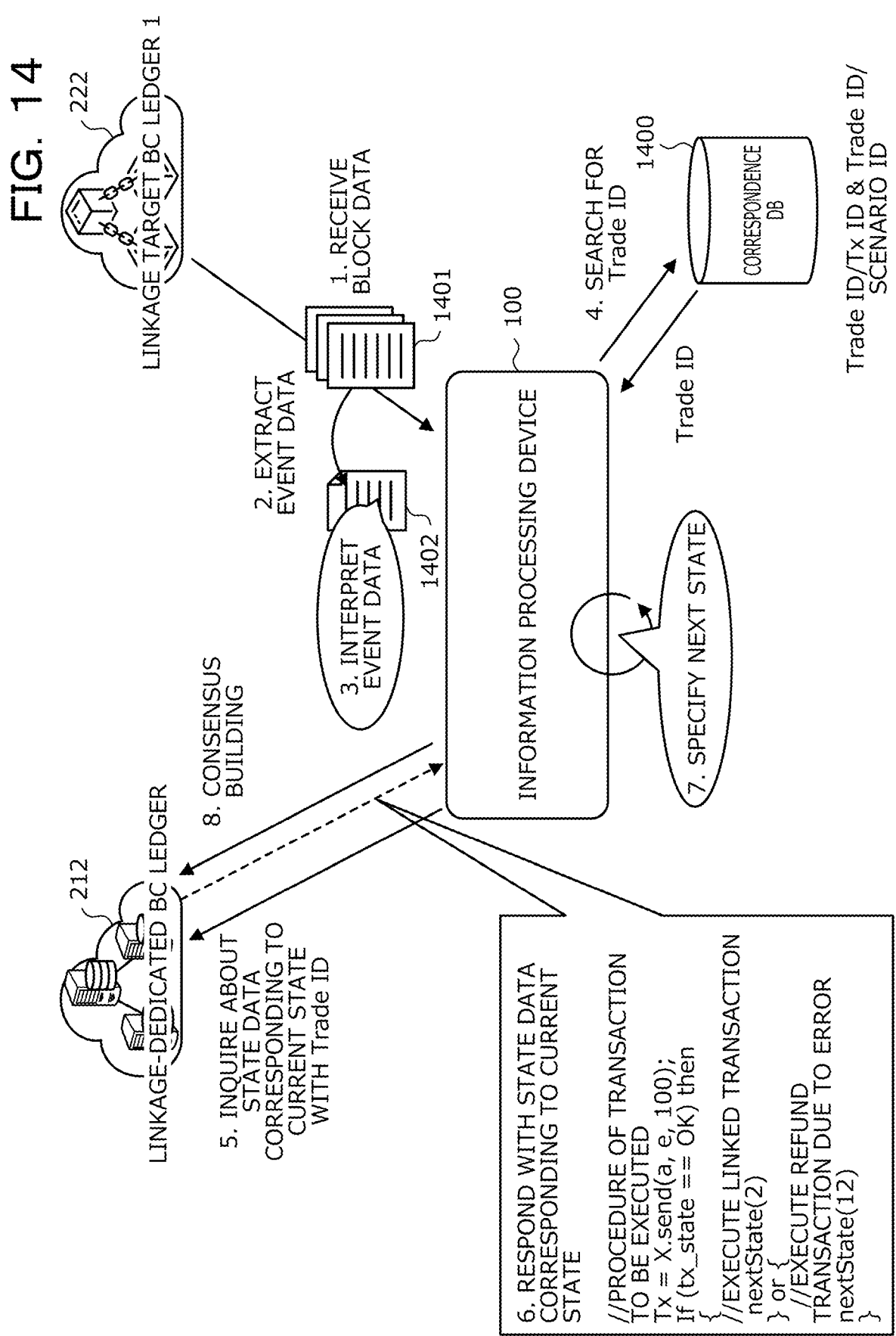
FIG. 14 is an explanatory diagram (part 2) illustrating an example of the working of the transaction control system 200 in a case where the information processing device 100 receives block data including event data relevant to an execution result of a transaction included in the series of transactions.

FIGS. 13 and 14 are explanatory diagrams illustrating an example of the working of the transaction control system 200 in a case where the information processing device 100 receives the block data including the event data relevant to an execution result of the transaction included in the series of transactions. Similarly to FIG. 9, the information processing device 100 includes the state transition management means 900, the transaction instruction creation means 901, the event filter means 902, the transaction instruction transmission means 903, and the data reception means 904.

The event filter means 902 is in a standby state for the block data including the event data relevant to the execution result of the transaction included in the series of transactions. The event filter means 902 has, for example, a parameter regarding the transaction as information that makes the event data relevant to the execution result of transaction included in the series of transactions specifiable.

(13-1) The event filter means 902 will receive the block data including the event data relevant to the execution result of the transaction included in the series of transactions, from the linkage target BC network 221 via the data reception means 904. The event filter means 902 checks whether or not the received block data includes the event data relevant to the execution result of the transaction included in the series of transactions.

(13-2) When the received block data includes the event data relevant to the execution result of the transaction included in the series of transactions, the event filter means 902 transmits the event data relevant to the execution result of the transaction included in the series of transactions to the state transition management means 900.

(13-3) When receiving the event data relevant to the execution result of the transaction included in the series of transactions, the state transition management means 900 specifies the Trade ID of the series of transactions. The state transition management means 900 calls the smart contract of the linkage-dedicated BC network 211, based on the specified Trade ID, and inquires of the called smart contract about the state data corresponding to the current state. The information processing device 100 receives the state data corresponding to the current state from the linkage-dedicated BC network 211.

(13-4) The state transition management means 900 specifies the next state, based on the script included in the received state data. The state transition management means 900 calls the smart contract of the linkage-dedicated BC network 211, based on the event data, and causes the linkage-dedicated BC network 211 to perform consensus building regarding transition to the next state.

The linkage-dedicated BC network 211 performs consensus building regarding transition to the next state by the smart contract and, when consensus building is successful, records the state data corresponding to the next state in the linkage-dedicated BC ledger 212. The linkage-dedicated BC network 211 transmits the result of consensus building to the state transition management means 900.

(13-5) The state transition management means 900 acquires the result of consensus building from the linkage-dedicated BC network 211. When consensus building is successful, the state transition management means 900 inquires of the linkage-dedicated BC network 211 about the state data corresponding to the current state and receives the state data corresponding to the current state from the linkage-dedicated BC network 211.

(13-6) The state transition management means 900 transmits the state data corresponding to the current state to the transaction instruction creation means 901. The transaction instruction creation means 901 creates the execution instruction for the transaction corresponding to the current state, based on the state data corresponding to the current state, and transmits the created execution instruction to the state transition management means 900. The state transition management means 900 receives the execution instruction for the transaction corresponding to the current state.

(13-7) When receiving the execution instruction for the transaction corresponding to the current state, the state transition management means 900 sets the standby state for an execution result of the transaction corresponding to the current state in the event filter means 902. The event filter means 902 can receive the block data from the linkage target BC network 221. The event filter means 902 shifts to the standby state for the execution result, in which it is specifiable whether the event data included in the received block data is relevant to the execution result of the transaction corresponding to the current state, based on the contents of the transaction corresponding to the current state.

(13-8) The state transition management means 900 transmits the received execution instruction for the transaction corresponding to the current state to the linkage target BC network 221. Thereafter, the event filter means 902 will receive the block data including the event data relevant to the execution result of the transaction included in the series of transactions, from the linkage target BC network 221. Next, description of FIG. 14 will be made, and an example of the working of the transaction control system 200 in a case where the information processing device 100 receives the block data including the event data relevant to the execution result of the transaction included in the series of transactions will be specifically described.

In FIG. 14, (14-1) the information processing device 100 receives block data 1401 from the linkage target BC network 221. (14-2) The information processing device 100 extracts event data 1402 from the received block data 1401. (14-3) The information processing device 100 interprets the event data 1402 and acquires a Tx ID serving as a guideline for specifying the Trade ID.

(14-4) The information processing device 100 acquires the Trade ID from a correspondence DB 1400, based on the acquired Tx ID. The correspondence DB 1400 stores the Tx ID and the Trade ID in association with each other. The correspondence DB 1400 further stores the Trade ID and the scenario ID in association with each other. The information processing device 100 acquires the scenario ID from the correspondence DB 1400, based on the acquired Trade ID.

(14-5) The information processing device 100 inquires of the linkage-dedicated BC network 211 about the state data corresponding to the current state, based on the acquired Trade ID. (14-6) The information processing device 100 receives the state data corresponding to the current state from the linkage-dedicated BC network 211. (14-7) The information processing device 100 specifies the next state, based on the script included in the received state data corresponding to the current state.

(14-8) The information processing device 100 transmits a consensus request for performing consensus building regarding the specified next state including the event data

1402 and the scenario ID to the linkage-dedicated BC network 211. When consensus building regarding the next state is successful, the linkage-dedicated BC network 211 acquires the original data of the state data corresponding to the next state, based on the scenario ID, and creates the state data corresponding to the next state. The linkage-dedicated BC network 211 records the created state data in the linkage-dedicated BC ledger 212 as new state data corresponding to the current state.

This may allow the information processing device 100 to appropriately proceed with the series of transactions. The information processing device 100 can accumulate the state data 800 in which the procedure of the transaction that has been executed is defined, in the linkage-dedicated BC ledger 212 in a state in which falsification is difficult, by linking with the linkage-dedicated BC network 211. Therefore, the information processing device 100 can enable to verify what kind of transaction has been executed afterwards and may make it easy to ensure transparency and neutrality.

(First Initialization Processing Procedure)

Next, an example of a first initialization processing procedure executed by the information processing device 100 will be described with reference to FIG. 15. The first initialization processing is implemented by, for example, the CPU 301, a storage area such as the memory 302 or the recording medium 305, and the network I/F 303 illustrated in FIG. 3.

Figure 15:
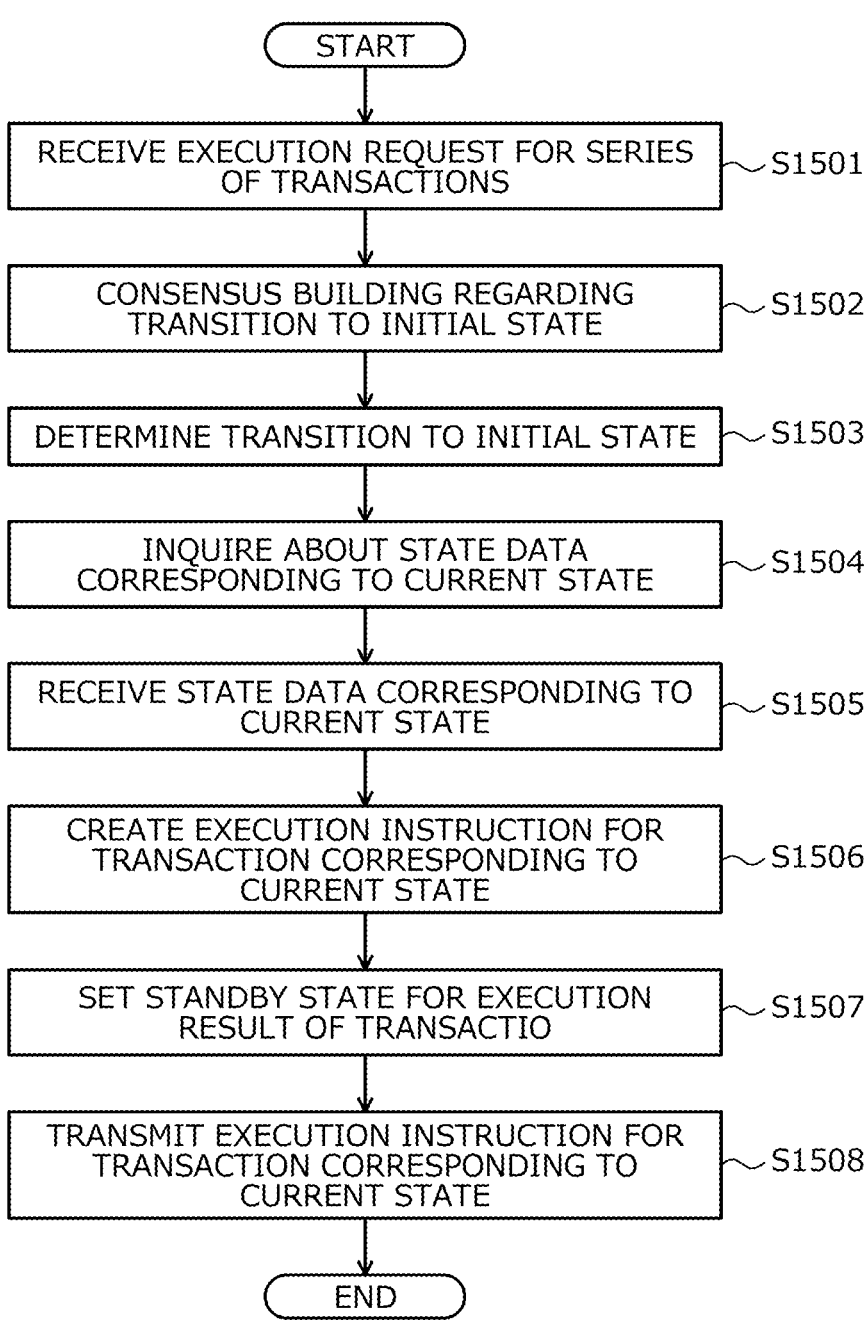
FIG. 15 is a flowchart illustrating an example of a first initialization processing procedure.

FIG. 15 is a flowchart illustrating an example of the first initialization processing procedure. In FIG. 15, the information processing device 100 receives, from the user terminal 203, an execution request for a series of transactions including parameters relating to the series of transactions and the scenario ID corresponding to the series of transactions (step S1501).

Next, the information processing device 100 calls the smart contract of the linkage-dedicated BC network 211, based on the parameters and the scenario ID included in the received execution request. Then, the information processing device 100 causes the linkage-dedicated BC network 211 to perform consensus building regarding transition to the initial state of the series of transactions (step S1502).

Next, the information processing device 100 acquires a call result for the smart contract. Then, the information processing device 100 detects that transition to the initial state of the series of transactions has been determined by consensus building and the state data corresponding to the initial state has been recorded in the linkage-dedicated BC ledger 212 (step S1503).

Next, the information processing device 100 transmits an inquiry about the state data corresponding to the current state of the series of transactions to the linkage-dedicated BC network 211, based on the Trade ID included in the call result for the smart contract (step S1504). Then, the information processing device 100 receives the state data corresponding to the current state from the linkage-dedicated BC network 211 (step S1505).

Next, the information processing device 100 creates an execution instruction for the transaction corresponding to the current state of the series of transactions, based on the operation included in the received state data (step S1506). Then, the information processing device 100 sets the standby state for the execution result of the transaction corresponding to the current state of the series of transactions (step S1507).

Next, the information processing device 100 transmits the created execution instruction for the transaction corresponding to the current state of the series of transactions to the linkage target BC network 221 (step S1508). Then, the information processing device 100 ends the first initialization processing. This allows the information processing device 100 to start the series of transactions and to enable to execute the transaction corresponding to the initial state.

(Second Initialization Processing Procedure)

Next, an example of a second initialization processing procedure executed by the information processing device 100 will be described with reference to FIG. 16. The second initialization processing is implemented by, for example, the CPU 301, a storage area such as the memory 302 or the recording medium 305, and the network I/F 303 illustrated in FIG. 3.

Figure 16:
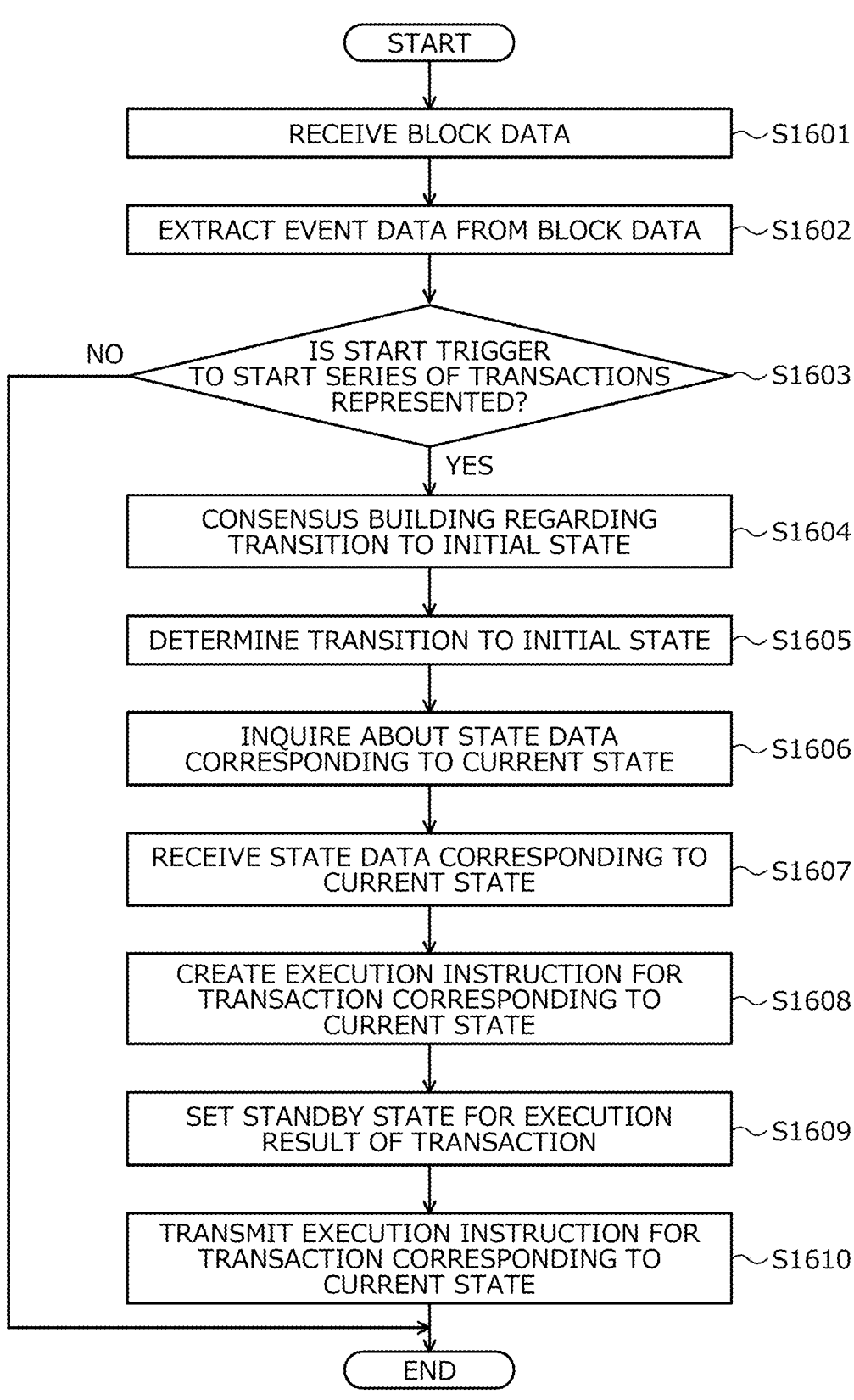
FIG. 16 is a flowchart illustrating an example of a second initialization processing procedure.

FIG. 16 is a flowchart illustrating an example of the second initialization processing procedure. In FIG. 16, the information processing device 100 receives the block data from the linkage target BC network 221 (step S1601).

Next, the information processing device 100 interprets the received block data and extracts the event data from the received block data (step S1602). Then, the information processing device 100 confirms whether or not the extracted event data represents the start trigger to start the series of transactions (step S1603).

Here, when the start trigger is not represented (step S1603: No), the information processing device 100 ends the second initialization processing. On the other hand, when the start trigger is represented (step S1603: Yes), the information processing device 100 proceeds to the processing in step S1604.

In step S1604, the information processing device 100 calls the smart contract of the linkage-dedicated BC network 211, based on the parameters and the scenario ID corresponding to the extracted event data. Then, the information processing device 100 causes the linkage-dedicated BC network 211 to perform consensus building regarding transition to the initial state of the series of transactions (step S1604).

Next, the information processing device 100 acquires a call result for the smart contract. Then, the information processing device 100 detects that transition to the initial state of the series of transactions has been determined by consensus building and the state data corresponding to the initial state has been recorded in the linkage-dedicated BC ledger 212 (step S1605).

Then, the information processing device 100 transmits an inquiry about the state data corresponding to the current state of the series of transactions to the linkage-dedicated BC network 211, based on the Trade ID included in the call result for the smart contract (step S1606).

Next, the information processing device 100 receives the state data corresponding to the current state from the linkage-dedicated BC network 211 (step S1607). Then, the information processing device 100 creates an execution instruction for the transaction corresponding to the current state of the series of transactions, based on the operation included in the received state data (step S1608).

Next, the information processing device 100 sets the standby state for the execution result of the transaction corresponding to the current state of the series of transactions (step S1609). Then, the information processing device 100 transmits the created execution instruction for the transaction corresponding to the current state of the series of transactions to the linkage target BC network 221 (step S1610). Thereafter, the information processing device 100 ends the second initialization processing. This allows the information processing device 100 to start the series of transactions and to enable to execute the transaction corresponding to the initial state.

(State Transition Processing Procedure)

Next, an example of a state transition processing procedure executed by the information processing device 100 will be described with reference to FIG. 17. State transition processing is implemented by, for example, the CPU 301, a storage area such as the memory 302 or the recording medium 305, and the network I/F 303 illustrated in FIG. 3.

FIG. 17 is a flowchart illustrating an example of the state transition processing procedure. In FIG. 17, the information processing device 100 receives the block data from the linkage target BC network 221 (step S1701).

Next, the information processing device 100 interprets the received block data and extracts the event data from the received block data (step S1702). Then, the information processing device 100 confirms whether or not the extracted event data includes an existing Trade ID (step S1703).

Here, when an existing Trade ID is not included (step S1703: No), the information processing device 100 ends the state transition processing. On the other hand, when an existing Trade ID is included (step S1703: Yes), the information processing device 100 proceeds to the processing in step S1704.

In step S1704, the information processing device 100 transmits an inquiry about the state data corresponding to the current state of the series of transactions to the linkage-dedicated BC network 211, based on the existing Trade ID (step S1704). Then, the information processing device 100 receives the state data corresponding to the current state from the linkage-dedicated BC network 211 (step S1705).

Next, the information processing device 100 calls the smart contract of the linkage-dedicated BC network 211, based on the condition included in the received state data and the extracted event data. Then, the information processing device 100 causes the linkage-dedicated BC network 211 to perform consensus building regarding transition to the next state of the series of transactions (step S1706).

Next, the information processing device 100 acquires a call result for the smart contract and detects that transition to the next state of the series of transactions has been determined by consensus building and the state data corresponding to the next state has been recorded in the linkage-dedicated BC ledger 212 (step S1707). Then, the information processing device 100 transmits an inquiry about the state data corresponding to the current state of the series of transactions to the linkage-dedicated BC network 211, based on the Trade ID included in the call result for the smart contract (step S1708).

Next, the information processing device 100 receives the state data corresponding to the current state from the linkage-dedicated BC network 211 (step S1709). Then, the information processing device 100 creates an execution instruction for the transaction corresponding to the current state of the series of transactions, based on the operation included in the received state data (step S1710).

Next, the information processing device 100 sets the standby state for the execution result of the transaction corresponding to the current state of the series of transactions (step S1711). Then, the information processing device 100 transmits the created execution instruction for the transaction corresponding to the current state of the series of transactions to the linkage target BC network 221 (step S1712). Thereafter, the information processing device 100 ends the state transition processing. This may allow the information processing device 100 to appropriately proceed with the series of transactions.

As described above, according to the information processing device 100, the state data corresponding to the current state can be acquired from the first BC network that manages the first distributed ledger that records the state data corresponding to the current state. According to the information processing device 100, the execution instruction for the transaction corresponding to the current state can be transmitted to a BC network included in a plurality of BC networks, based on the acquired state data. According to the information processing device 100, the next state of the series of transactions can be determined by linking with the first BC network, based on the condition defined in the acquired state data. This may allow the information processing device 100 to appropriately proceed with the series of transactions.

According to the information processing device 100, at the start of the series of transactions, parameters relating to the series of transactions can be acquired from the user terminal 203 related to the series of transactions. According to the information processing device 100, the original data of the state data corresponding to the initial state of the series of transactions can be acquired from the first BC network. According to the information processing device 100, the recording request for the state data corresponding to the initial state can be transmitted to the first BC network, based on the acquired original data and the acquired parameters. This allows the information processing device 100 to cause the plurality of BC networks to start the series of transactions.

According to the information processing device 100, the state data corresponding to the current state and recorded in the first distributed ledger can be updated with the state data corresponding to the next state. This may allow the information processing device 100 to enable to appropriately execute the transaction corresponding to the next state.

According to the information processing device 100, when the execution instruction for the transaction corresponding to the current state has been transmitted, a shift to the standby state for the execution result of the transaction corresponding to the current state can be made, and in the standby state, the execution result of the transaction corresponding to the current state can be accepted. According to the information processing device 100, the next state of the series of transactions can be determined by linking with the first BC network, based on the condition defined in the acquired state data and the accepted execution result. This may allow the information processing device 100 to appropriately proceed with the series of transactions, according to the execution result of the transaction included in the series of transactions.

According to the information processing device 100, in the standby state, the fact that a certain period of time has elapsed without accepting the execution result of the transaction corresponding to the current state can be detected. According to the information processing device 100, when the fact that the certain period of time has elapsed is detected, the next state of the series of transactions can be determined by linking with the first BC network, based on the condition defined in the acquired state data and the result of detecting that the certain period of time has elapsed. This may allow the information processing device 100 to appropriately proceed with the series of transactions in response to the fact that the transaction included in the series of transactions has failed to be executed.

According to the information processing device 100, the state data corresponding to the current state can be acquired from the first BC network, based on identification information that identifies the series of transactions. This may allow the information processing device 100 to appropriately acquire the state data corresponding to the current state.

According to the information processing device 100, the smart contract that manages the first distributed ledger enables to link with the first BC network that manages the first distributed ledger. This allows the information processing device 100 to use the smart contract that manages the first distributed ledger.

Note that the control method described in the present embodiments may be implemented by executing, in a computer such as a PC or a workstation, a program prepared in advance. The control program described in the present embodiments is executed by being recorded on a computer-readable recording medium and being read from the recording medium by the computer. The recording medium is a hard disk, a flexible disk, a compact disc (CD)-ROM, a magneto optical disc (MO), a digital versatile disc (DVD), or the like. In addition, the control program described in the present embodiments may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method implemented by a computer configured to be operable as a relay device for controlling a series of transactions across a plurality of blockchain networks, the control method comprising:

acquiring, from a first blockchain network that manages a first distributed ledger, state data that corresponds to a current state, the first distributed ledger being configured to record the state data that corresponds to the current state, wherein parameters that relate to a series of transactions executed via a plurality of blockchain networks, a procedure of the transactions that correspond to the current state of the series of transactions, and a condition that relates to a state transition in the series of transactions are defined in the first distributed ledger;

transmitting an execution instruction for the transactions that correspond to the current state, which has been created by assigning any of the parameters defined in the acquired state data to the procedure of the transactions that correspond to the current state, which is defined in the acquired state data, to the blockchain networks included in the plurality of blockchain networks;

when the execution instruction for the transactions that correspond to the current state has been transmitted, shifting to a standby state for an execution result of the transactions that correspond to the current state;

accepting the execution result of the transactions that correspond to the current state in the standby state; and determining a state transition destination of the current state of the series of transactions by linking with the first blockchain network, based on the condition defined in the acquired state data and the accepted execution result.

2. The control method according to claim 1, wherein the first blockchain network further manages original data of the state data that corresponds to each state of the series of transactions, and the control method further comprises:

acquiring, at a start of the series of transactions, the parameters that relate to the series of transactions from a user terminal related to the series of transactions;

acquiring, from the first blockchain network, the original data of the state data that corresponds to an initial state of the series of transactions; and transmitting, to the first blockchain network, a recording request for the state data that corresponds to the initial state, which is created by combining the acquired parameters with the acquired original data.

3. The control method according to claim 1, wherein the first blockchain network further manages original data of the state data that corresponds to each state of the series of transactions, and the determining includes:

determining the state transition destination of the current state of the series of transactions by linking with the first blockchain network, based on the condition defined in the acquired state data; and updating the state data that corresponds to the current state and is recorded in the first distributed ledger, to the state data that corresponds to the state transition destination of the current state.

4. The control method according to claim 1, the control method further comprising:

detecting that a certain period of time has elapsed without accepting the execution result of the transactions that correspond to the current state in the standby state, wherein the determining includes when detecting that the certain period of time has elapsed, determining the state transition destination of the current state of the series of transactions by linking with the first blockchain network, based on the condition defined in the acquired state data and a result of detecting that the certain period of time has elapsed.

5. The control method according to claim 1, wherein the first blockchain network further manages identification information that identifies the series of transactions in association with the identification information that identifies the state data that corresponds to the current state, and the acquiring the state data includes acquiring, from the first blockchain network, the state data that corresponds to the current state, based on the identification information that identifies the series of transactions.

6. The control method according to claim 1, wherein the acquiring the state data includes acquiring the state data again when accepting the execution result of the transactions that correspond to the current state in the standby state.

7. The control method according to claim 1, wherein the first blockchain network manages the first distributed ledger by a smart contract that manages the first distributed ledger.

8. A non-transitory computer-readable recording medium storing a control program comprising instructions which, when executed by a computer configured to be operable as a relay device for controlling a series of transactions across a plurality of blockchain networks, cause the computer to perform processing, the processing including:

acquiring, from a first blockchain network that manages a first distributed ledger, state data that corresponds to a current state, the first distributed ledger being configured to record the state data that corresponds to the current state, wherein parameters that relate to a series of transactions executed via a plurality of blockchain networks, a procedure of the transactions that correspond to the current state of the series of transactions, and a condition that relates to a state transition in the series of transactions are defined in the first distributed ledger;

transmitting an execution instruction for the transactions that correspond to the current state, which has been created by assigning any of the parameters defined in the acquired state data to the procedure of the transactions that correspond to the current state, which is defined in the acquired state data, to the blockchain networks included in the plurality of blockchain networks; and when the execution instruction for the transactions that correspond to the current state has been transmitted, shifting to a standby state for an execution result of the transactions that correspond to the current state;

accepting the execution result of the transactions that correspond to the current state in the standby state;

determining a state transition destination of the current state of the series of transactions by linking with the first blockchain network, based on the condition defined in the acquired state data and the accepted execution result.

9. An information processing apparatus configured to be operable as a relay device for controlling a series of transactions across a plurality of blockchain networks, the information processing apparatus comprising:

memory; and processor circuitry coupled to the memory, the processor circuitry being configured to perform processing including:

acquiring, from a first blockchain network that manages a first distributed ledger, state data that corresponds to a current state, the first distributed ledger being configured to record the state data that corresponds to the current state, wherein parameters that relate to a series of transactions executed via a plurality of blockchain networks, a procedure of the transactions that correspond to the current state of the series of transactions, and a condition that relates to a state transition in the series of transactions are defined in the first distributed ledger;

transmitting an execution instruction for the transactions that correspond to the current state, which has been created by assigning any of the parameters defined in the acquired state data to the procedure of the transactions that correspond to the current state, which is defined in the acquired state data, to the blockchain networks included in the plurality of blockchain networks;

when the execution instruction for the transactions that correspond to the current state has been transmitted, shifting to a standby state for an execution result of the transactions that correspond to the current state;

accepting the execution result of the transactions that correspond to the current state in the standby state; and determining a state transition destination of the current state of the series of transactions by linking with the first blockchain network, based on the condition defined in the acquired state data and the accepted execution result.

\* \* \* \* \*